United States Patent
Chan

(10) Patent No.: US 11,359,702 B2
(45) Date of Patent: Jun. 14, 2022

(54) MULTI-CONFIGURATION BELT TENSIONER

(71) Applicant: Shihwen Chan, Los Alamitos, CA (US)

(72) Inventor: Shihwen Chan, Los Alamitos, CA (US)

( * ) Notice: Subject to any disclaimer, the term of this patent is extended or adjusted under 35 U.S.C. 154(b) by 370 days.

(21) Appl. No.: 16/752,169

(22) Filed: Jan. 24, 2020

(65) Prior Publication Data
US 2021/0025482 A1     Jan. 28, 2021

Related U.S. Application Data

(60) Provisional application No. 62/878,663, filed on Jul. 25, 2019.

(51) Int. Cl.
*F16H 7/12*     (2006.01)
*F16H 7/08*     (2006.01)

(52) U.S. Cl.
CPC ..... *F16H 7/1281* (2013.01); *F16H 2007/081* (2013.01); *F16H 2007/088* (2013.01); *F16H 2007/0863* (2013.01); *F16H 2007/0893* (2013.01)

(58) Field of Classification Search
CPC ............. F16H 2007/081; F16H 7/1281; F16H 2007/088; F16H 2007/0846; F16H 2007/0878; F16H 2007/0893
USPC ......................................... 474/135, 133, 112
See application file for complete search history.

(56) References Cited

U.S. PATENT DOCUMENTS

| | | | | |
|---|---|---|---|---|
| 1,835,617 A * | 12/1931 | Stewart | ................ | F16H 7/1281 474/135 |
| 4,285,676 A * | 8/1981 | Kraft | ................ | F16H 7/1281 267/155 |
| 4,500,303 A * | 2/1985 | Sermersheim | ........ | F16H 7/1281 424/117 |
| 4,504,252 A * | 3/1985 | Honma | ................ | F16C 13/006 474/135 |
| 4,618,335 A * | 10/1986 | Brandenstein | ........ | F16H 7/1281 474/112 |
| 4,822,322 A * | 4/1989 | Martin | ................ | F16H 7/129 474/135 |
| 4,934,988 A * | 6/1990 | Kawamura | ........... | F16H 7/1281 474/135 |
| 5,078,656 A * | 1/1992 | Brandenstein | ........ | F16H 7/1281 474/112 |

(Continued)

*Primary Examiner* — Henry Y Liu
(74) *Attorney, Agent, or Firm* — Anatoly S. Wesier, Esq.; IPLCounsel.com

(57) ABSTRACT

Described embodiments include a reconfigurable belt tensioner that can be used to add, remove, and/or reposition peripheral accessories of an engine installation, for example, in an automobile or another vehicle. The tensioner has a housing, an arm with an axle, and a spring installed in the housing. The axle is inserted into and fastened to the housing. The arm rotates around the axle. When the arm is rotated, the spring provides the force that tends to return the arm and the housing to the original position. The tensioner can be reconfigured by repositioning the spring relative to the housing and/or the arm, changing the angle between the housing and the arm. The tensioner may be used, for example, on an LS-based GM small-block engine, and allow operation with and without the air conditioning compressor or other accessories.

19 Claims, 24 Drawing Sheets

(56) References Cited

U.S. PATENT DOCUMENTS

| | | | | |
|---|---|---|---|---|
| 5,489,243 A * | 2/1996 | Watanabe | F16H 7/1281 | 123/90.31 |
| 5,591,094 A * | 1/1997 | Farmer | F16H 7/1218 | 474/135 |
| 6,001,037 A * | 12/1999 | Rocca | F16H 7/1281 | 474/135 |
| 6,149,542 A * | 11/2000 | Lehtovaara | F16H 7/24 | 474/112 |
| 6,416,435 B1 * | 7/2002 | Szatkowski | F16H 7/129 | 474/135 |
| 6,699,149 B1 * | 3/2004 | White | F16H 7/18 | 474/135 |
| 7,163,478 B2 * | 1/2007 | Oliver | F16H 7/1281 | 474/133 |
| 7,611,431 B2 * | 11/2009 | Dinca | F16H 7/24 | 474/135 |
| 7,951,030 B2 * | 5/2011 | Ward | F16H 7/1218 | 474/135 |
| 7,980,976 B2 * | 7/2011 | Stepniak | F16H 7/1281 | 474/135 |
| 8,272,983 B2 * | 9/2012 | Rolando | F16H 7/1218 | 474/112 |
| 8,690,718 B2 * | 4/2014 | Cantatore | F16H 7/1281 | 474/111 |
| 8,840,495 B2 * | 9/2014 | Comsa | F01L 1/024 | 474/135 |
| 8,888,626 B2 * | 11/2014 | deJong | F16H 7/129 | 474/135 |
| 10,323,731 B2 * | 6/2019 | Tronquoy | F16H 7/1218 | |
| 2003/0216203 A1 * | 11/2003 | Oliver | F16H 7/1281 | 474/134 |
| 2005/0282668 A1 * | 12/2005 | Ali | F16H 7/1281 | 474/101 |
| 2006/0258497 A1 * | 11/2006 | Dec | F16H 7/1218 | 474/112 |
| 2008/0026894 A1 * | 1/2008 | Dinca | F16H 7/24 | 474/112 |
| 2008/0139353 A1 * | 6/2008 | Stepniak | F16H 7/1281 | 474/112 |
| 2008/0287233 A1 * | 11/2008 | Cantatore | F16H 7/1218 | 474/112 |
| 2009/0023528 A1 * | 1/2009 | Dickson | F16H 7/1281 | 474/135 |
| 2009/0075768 A1 * | 3/2009 | D'Silva | F16H 7/1218 | 474/135 |
| 2010/0069185 A1 * | 3/2010 | Ward | F16H 7/1281 | 474/117 |
| 2011/0045929 A1 * | 2/2011 | Rolando | F16H 7/1218 | 474/112 |
| 2011/0143873 A1 * | 6/2011 | deJong | F16H 7/129 | 474/117 |
| 2011/0294614 A1 * | 12/2011 | Bigler | F16H 7/1281 | 474/133 |
| 2011/0312454 A1 * | 12/2011 | Comsa | F01L 1/024 | 474/135 |
| 2012/0316018 A1 * | 12/2012 | Ward | F16H 7/1218 | 474/135 |
| 2013/0085027 A1 * | 4/2013 | Meckstroth | F16H 7/1218 | 474/135 |
| 2013/0172137 A1 * | 7/2013 | Antchak | F16H 7/1281 | 474/133 |
| 2013/0217525 A1 * | 8/2013 | Crist | F16H 7/1281 | 474/111 |
| 2013/0260933 A1 * | 10/2013 | Dutil | F16H 7/0831 | 474/135 |
| 2014/0213400 A1 * | 7/2014 | Hallen | F16H 7/1218 | 474/135 |
| 2015/0031484 A1 * | 1/2015 | Lindstrom | F16H 7/1218 | 474/117 |
| 2015/0247559 A1 * | 9/2015 | Graves | F16F 3/04 | 474/117 |
| 2015/0275706 A1 * | 10/2015 | Frankowski | F16H 7/12 | 123/90.31 |

* cited by examiner

MULTI-CONFIGURATION BELT TENSIONER

CROSS-REFERENCE TO RELATED APPLICATION

This application claims priority to U.S. Provisional Patent Application Ser. No. 62/878,663, entitled MULTI-CONFIGURATION BELT TENSIONER, filed Jul, 25, 2019, which is hereby incorporated by reference in its entirety as if fully set forth herein, including Specification, Figures, Claims, and all other matter.

FIELD OF THE DISCLOSURE

This document relates to the field of belt drive systems, and particularly to serpentine belt tensioners for driving peripheral accessories of an engine.

BACKGROUND

Automotive and other vehicular engine installations typically include several peripheral accessories driven by a belt that forms a continuous/endless loop. The accessories may include air conditioning compressors, alternators, water/coolant pumps, power steering pumps, air pumps, and other devices. The belt is driven by a pulley connected to the engine crankshaft. It forms a continuous loop. Each accessory includes a shaft with a pulley rotated by the belt. To operate properly with multiple (e.g., three or more pulleys, idler pulleys may be added, causing the belt to take a serpentine shape. Additionally, one or more belt tensioners may be added in such belt drive systems, to keep the serpentine belt under tension sufficient to prevent slippage of the belt and its falling off the pulleys, particularly when the belt stretches under load and with passage of time.

A modern engine installation may need to accommodate multiple configurations, each with its own accessories. For example, an air conditioning compressor may need to be included in some cars, and excluded in other cars of the same model. Moreover, an engine installation in the same car may need to be reconfigured, for example, for daily driving with air conditioning, and weekend racing without air conditioning. A need in the art exists to facilitate installation of an engine selectively with and without certain peripheral accessories. A need in the art exists to facilitate reconfiguration of an engine installation with different selections of peripheral accessories.

SUMMARY

Embodiments described in this document include a multi-configuration/re-configurable tensioner for belt drive systems, and particularly for serpentine belt drive systems.

In an embodiment, a belt tensioner includes a housing comprising a first side housing surface and a second side housing surface parallel to the first side housing surface, the housing further comprising portions defining an arm positioning hole of a first diameter, a receptacle of a second diameter with a substantially cylindrical center member having an outside surface with a third diameter and a plurality of indents. The first diameter is smaller than the second diameter and the third diameter, and the third diameter is smaller than the first diameter. The center member, the arm positioning hole, and the receptacle are concentric with a common first axis. The arm positioning hole protrudes from the first side housing surface through the center member. The belt tensioner also includes an arm comprising a main body having a first side arm surface and a second side arm surface parallel to the first side arm surface, a pulley attaching portion extending from the second side arm surface, a circular step portion on the first side arm surface, and portions defining an axle receiving opening from the first side arm surface to the second side arm surface, and an axle. The circular step portion and the axle receiving opening are concentric. The circular step portion comprises portions defining a plurality of pits on the first side arm surface at substantially same distance from center of the circular step portion. The axle comprises a cylindrical axle body having first and second ends and a thicker portion on the second end, the axle being inserted into the axle receiving opening and being attached to the axle main body at the thicker portion, the axle extending from the circular step portion. The belt tensioner also includes a spring comprising a coiled body, a horizontal end, and a vertical end. The first spring end fits in each of the plurality of indents, thereby preventing rotation of the spring relative to the cylindrical center member of the housing. The second end of the spring fits in each of the pits of the circular step portion, thereby causing the spring into compression or extension when the arm is rotated relative to the housing. When the belt tensioner is assembled, the spring is inserted into the receptacle with the horizontal end being inserted into a selected indent of the plurality of indents, and the axle is inserted into the arm positioning hole to protrude through the first side housing surface and fastened relative to the arm positioning hole near the first side housing surface.

In aspects, the belt tensioner further includes a bushing comprising a bushing cap and a main bushing portion having an outside bushing diameter, a bushing hole through the bushing cap and the main bushing portion, the bushing hole having an inside bushing diameter, the outside bushing diameter being sized to fit snugly into the arm positioning hole when the bushing is inserted into the arm positioning hole from the first side housing surface, the bushing cap preventing the bushing from going through the arm positioning hole, the inside bushing diameter allowing the axle to rotate in the bushing.

In aspects, the bushing is made of material softer than material from which the housing is made.

In aspects, the housing and the arm are made from one or more metals, and the bushing is made from a polymer.

In aspects, the axle further comprises an axle cap on the first end of the axle, the axle cap preventing the axle from going through the axle receiving opening.

In aspects, the axle receiving opening has a larger diameter at the circular step portion to a cap depth, and a smaller diameter from the second side arm surface to the cap depth from the cap depth, the cap depth is substantially equal to thickness of the axle cap, and the larger diameter at the circular step is substantially equal to diameter of the axle cap, so that the axle cap is substantially flush with the circular step portion.

In aspects, the first end of the axle body has a groove protruding through the bushing cap when the axle is inserted into the arm positioning hole to protrude through the first side housing surface, and the belt tensioner further includes a snap ring placed on the groove thereby fastening the axle to the arm positioning hole.

In aspects, the first end of the axle body has a diametrical cotter pin hole protruding through the bushing cap when the axle is inserted into the arm positioning hole to protrude through the first side housing surface, and the belt tensioner farther includes a cotter pin placed on the cotter pin hole thereby fastening the axle to the arm positioning hole.

In aspects, the plurality of pits consists of a first pit and a second pit, and the plurality of indents consists of a first indent and a second indent.

In aspects, the horizontal end of the spring and the vertical end of the spring are on the same radial of the coiled body of the spring.

In aspects, the horizontal end of the spring and the vertical end of the spring are on different radials of the coiled body of the spring.

In aspects, the belt tensioner is provided with a second spring comprising a second spring coiled body, a second spring horizontal end, and a second spring vertical end, the angle between radials of the second spring vertical end and the second spring, horizontal end being different from the angle between the radials of the spring horizontal end and the spring vertical end, thereby allowing reconfiguring the belt tensioner using different springs.

In aspects, the thicker portion of the axle is press-fitted into the axle receiving opening.

In aspects, the pulley attaching portion comprises a threaded hole to install a tensioner pulley.

In aspects, the housing further comprises a plurality of holes for attaching the tensioner.

In aspects, the housing further comprises one or more holes for attaching accessories.

In aspects, the belt tensioner is combined with a tensioner pulley installed on the pulley attaching portion.

In aspects, the reconfigurable belt tensioner is provided with a second spring comprising a second spring coiled body, a second spring horizontal end, and a second spring vertical end, the angle between radials of the second spring vertical end and the second spring horizontal end being different from the angle between the radials of the spring horizontal end and the spring vertical end, thereby allowing reconfiguring the reconfigurable belt tensioner using different springs.

In aspects, the thicker portion of the axle is press-fitted into the axle receiving opening.

In aspects, the pulley attaching portion comprises a threaded hole for installing a tensioner pulley.

In aspects, the housing further comprises a plurality of tensioner attaching holes.

In aspects, the housing further comprises one or more accessory attaching holes.

In aspects, the tensioner is combined with a tensioner pulley installed on the pulley attaching portion.

In aspects, the tensioner includes a washer on the axle. The washer separates the circular step portion from the center member.

These and other features and aspects of selected embodiments not inconsistent with the present description will be better understood with reference to the following description, drawings, and appended claims.

DETAILED DESCRIPTION

Figure 1A:
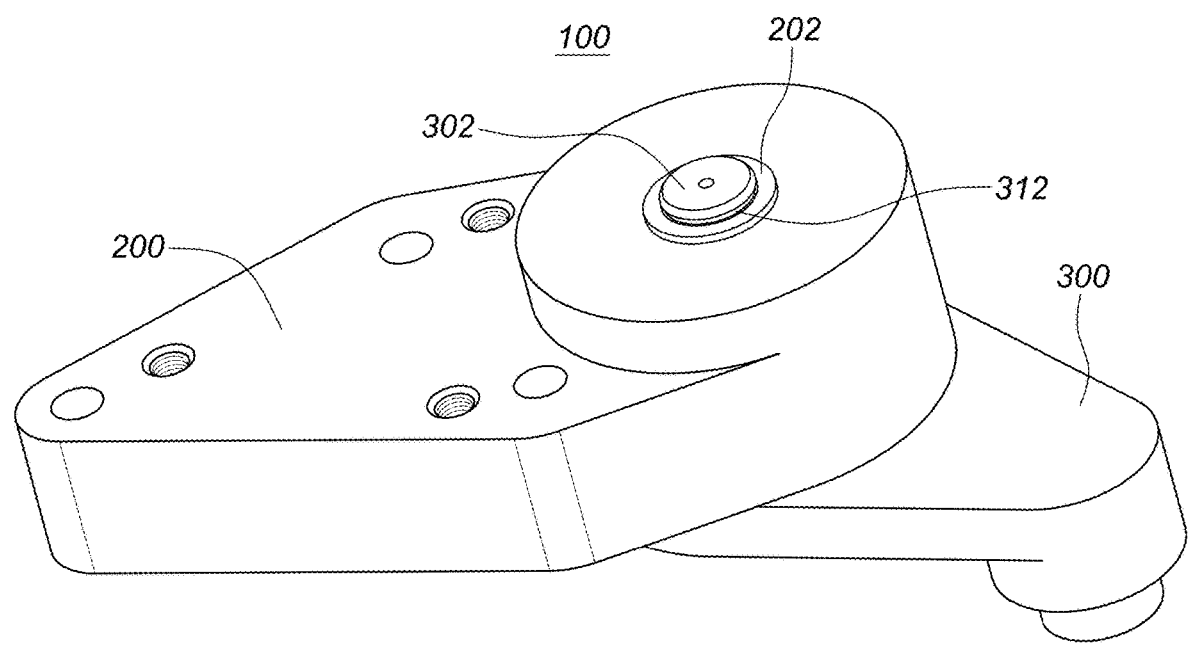
FIGS. 1A through 1F are perspective views illustrating selected features of a reconfigurable tensioner in a first configuration.
Figure 1B:
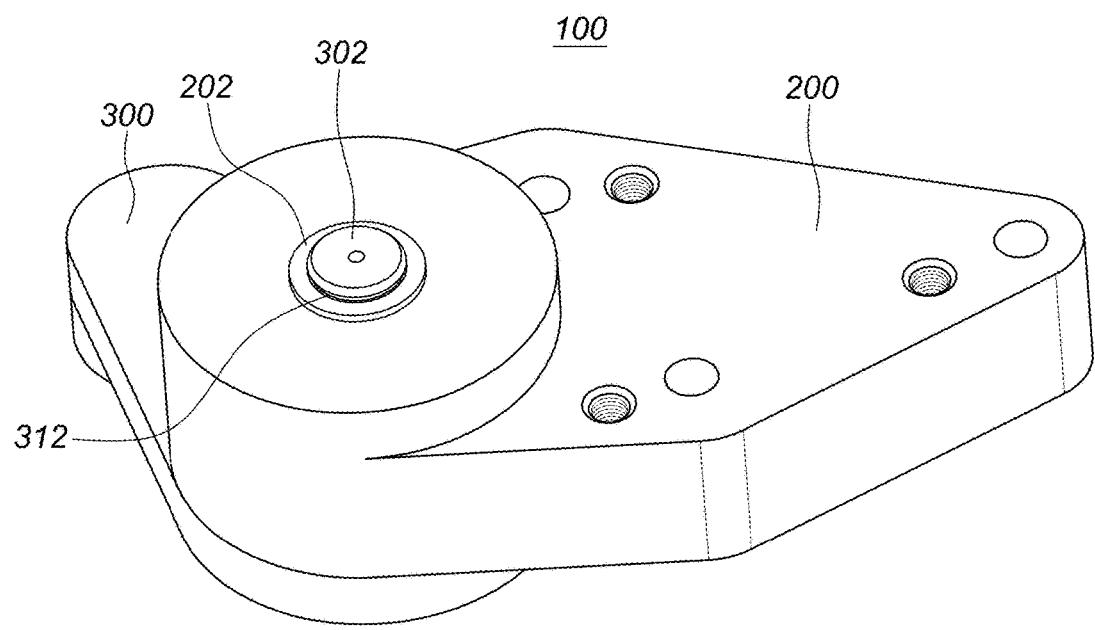
Figure 1C:
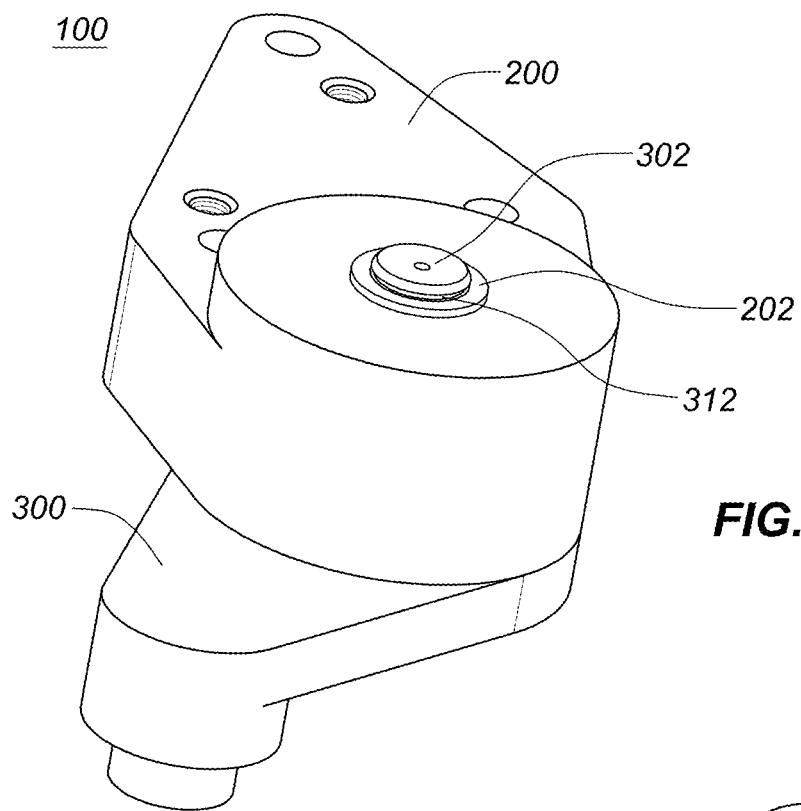
Figure 1D:
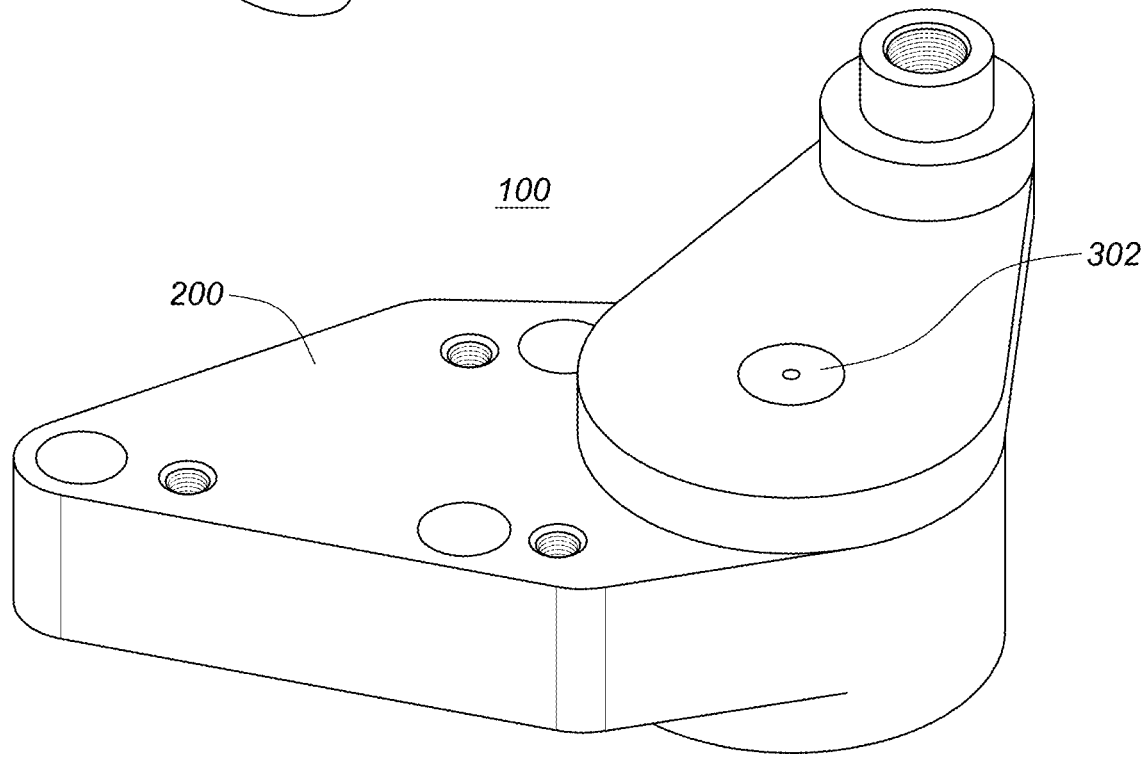
Figure 1E:
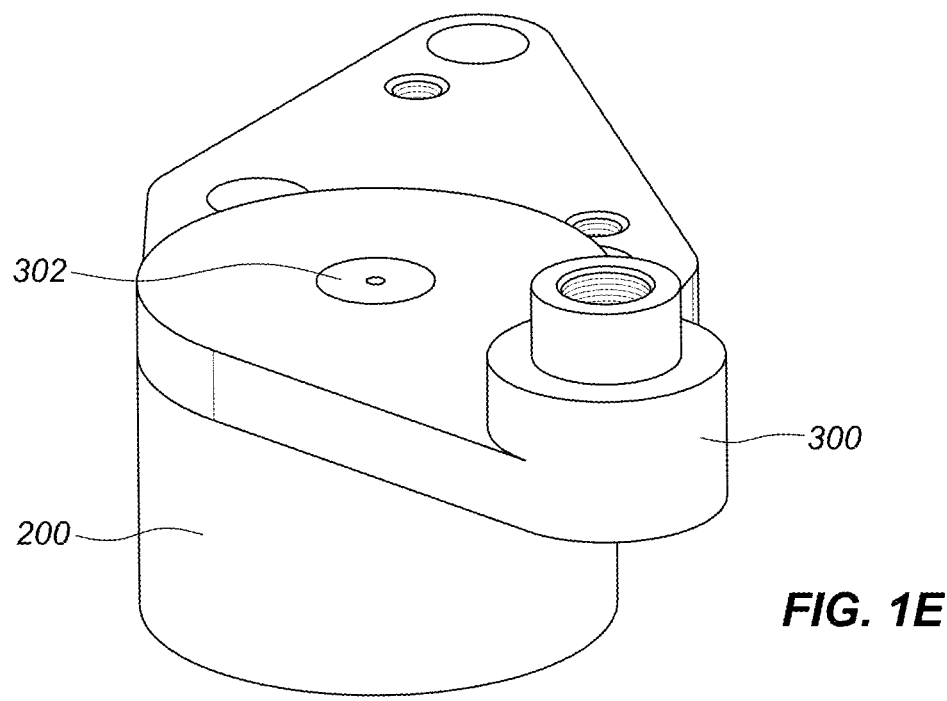
Figure 1F:
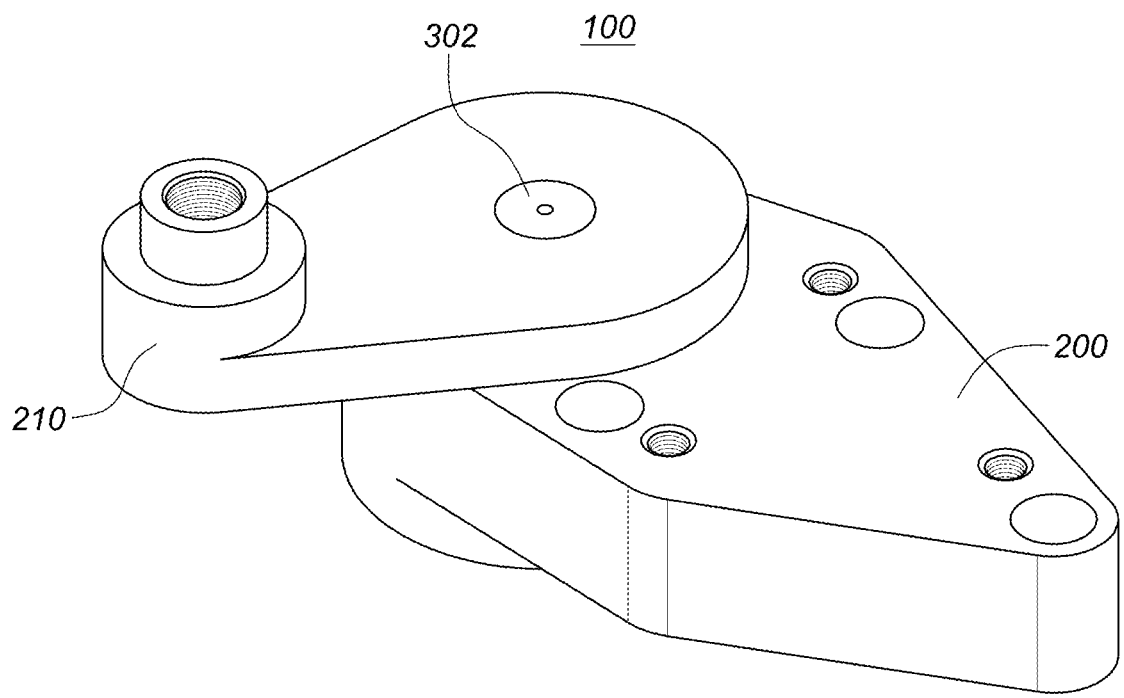
Figure 1G:
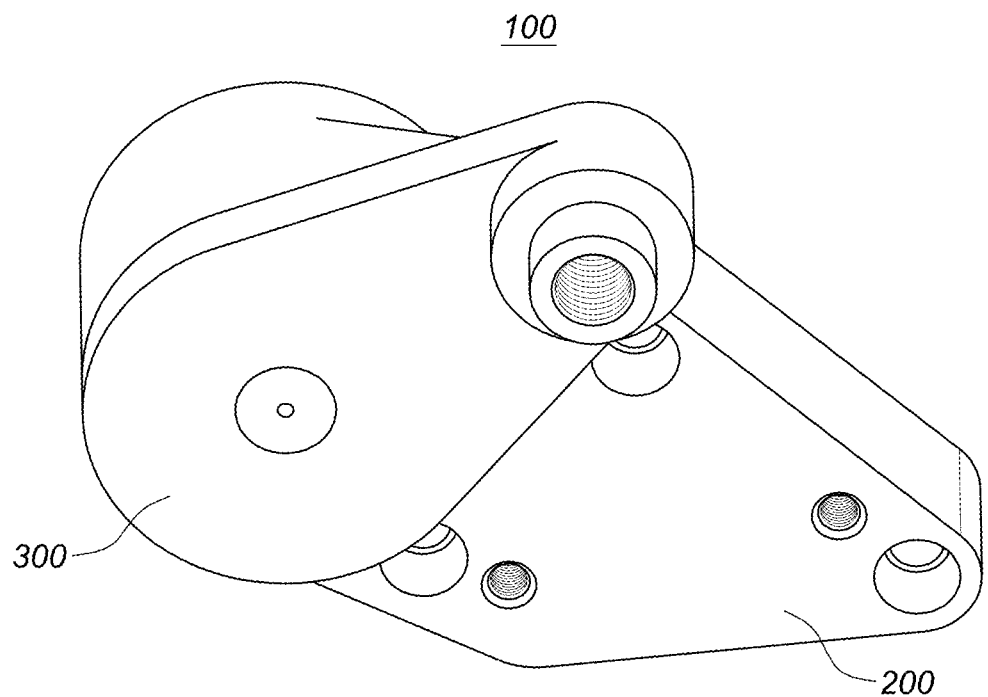
FIGS. 1G and 1H are perspective views illustrating selected features of the tensioner in a second configuration.
Figure 1H:
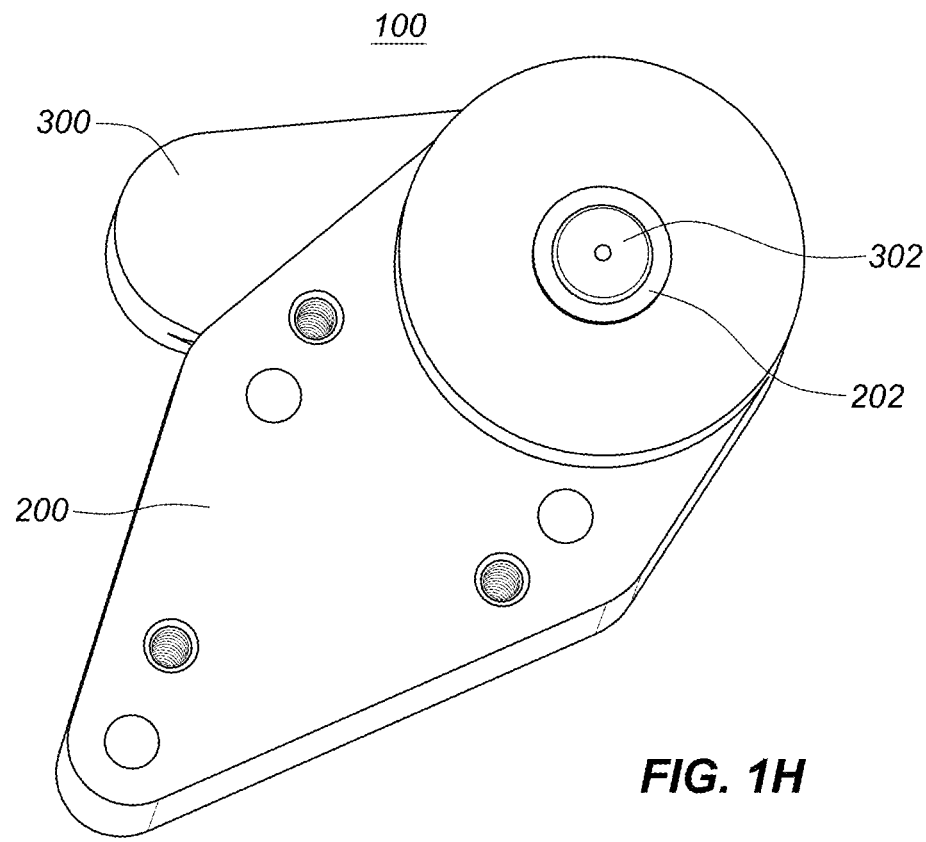
Figure 2A:
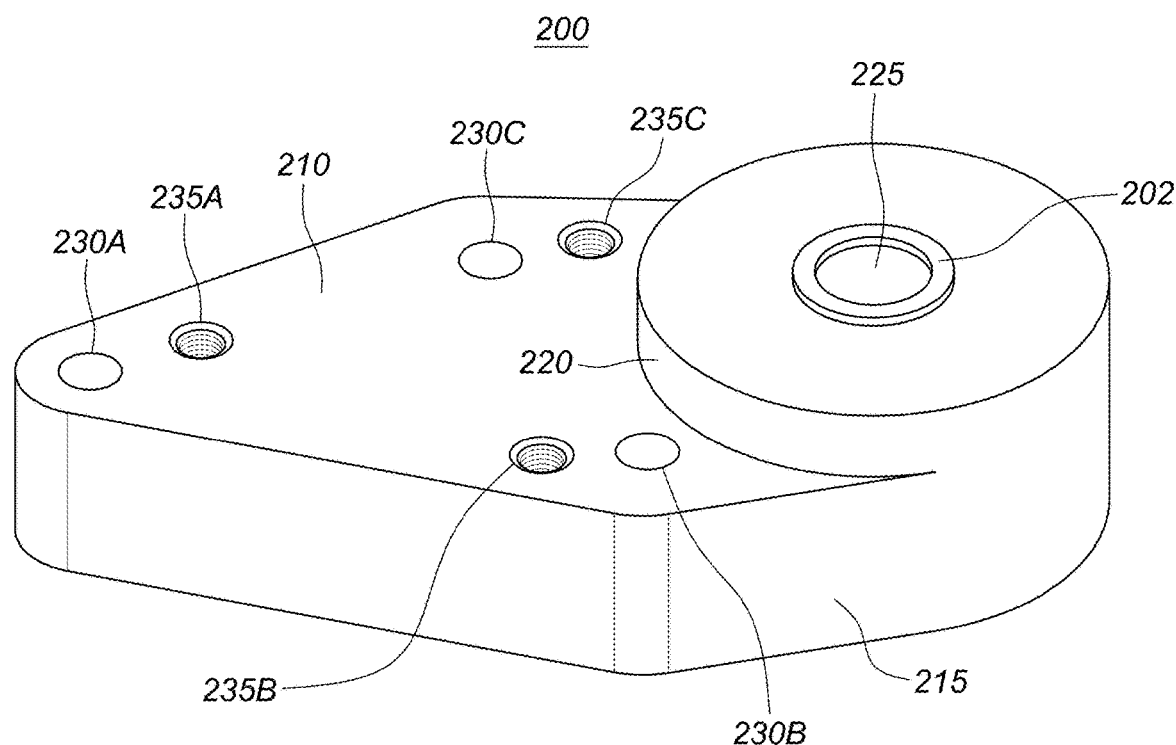
FIGS. 2A through 2E are perspective views illustrating selected features of the tensioner housing.
Figure 2B:
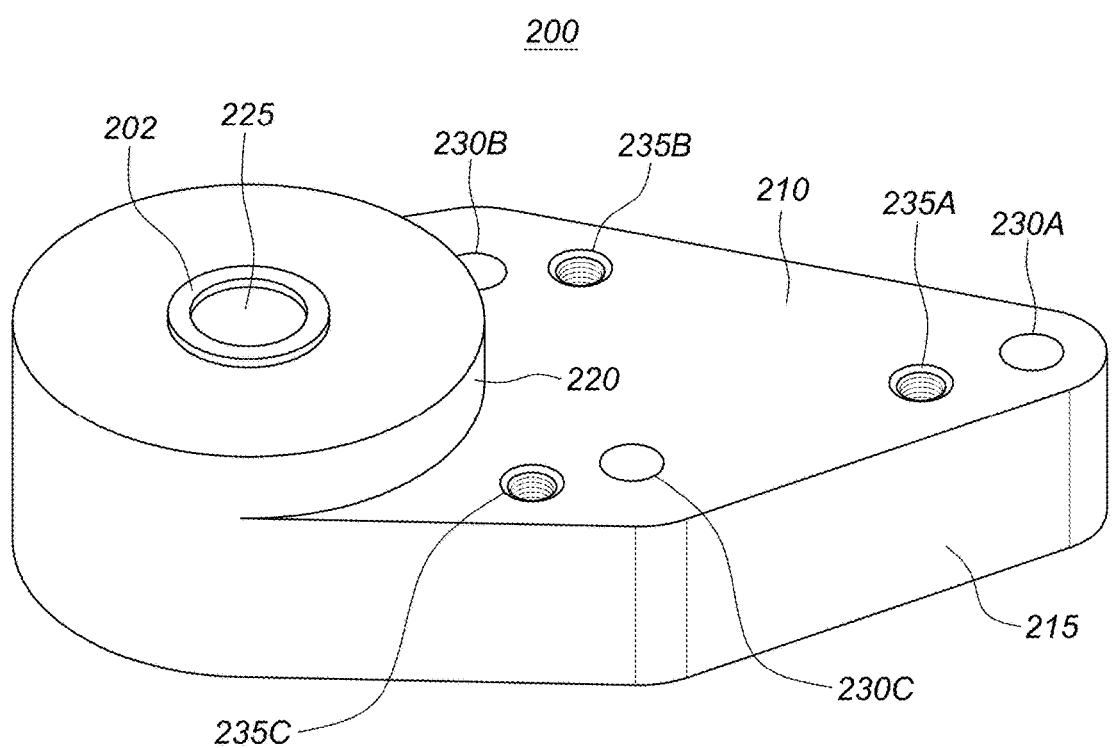
Figure 2C:
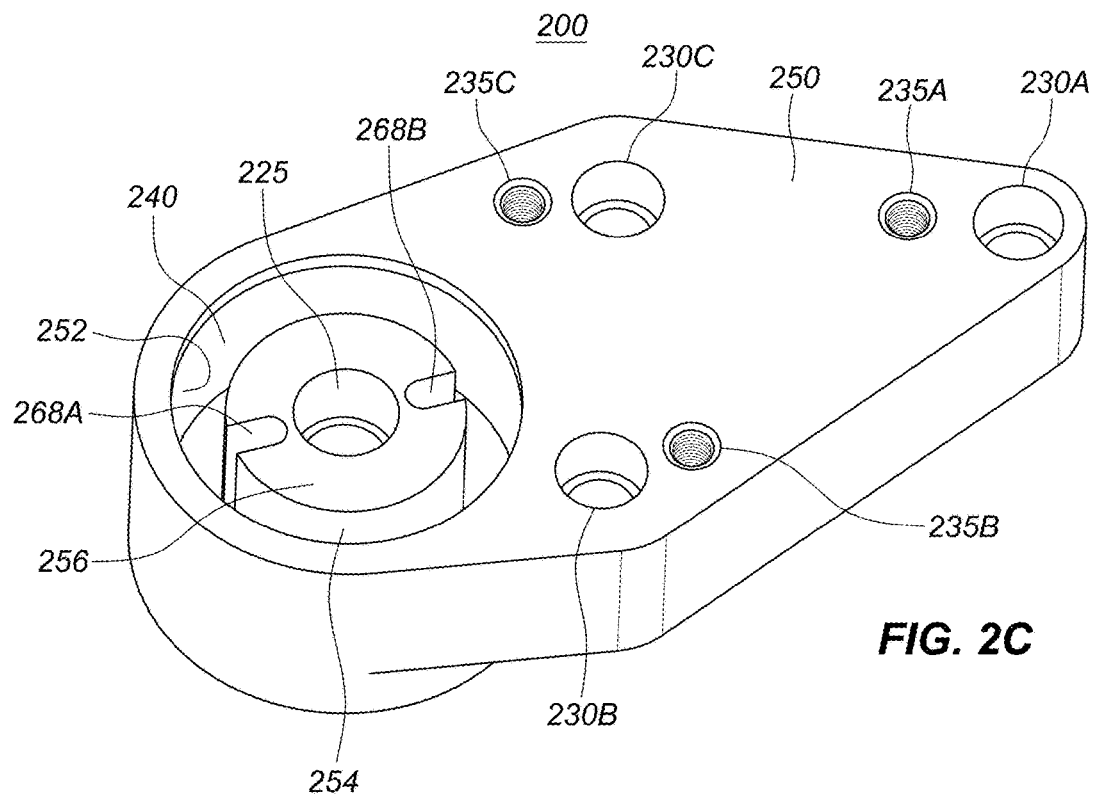
Figure 2D:
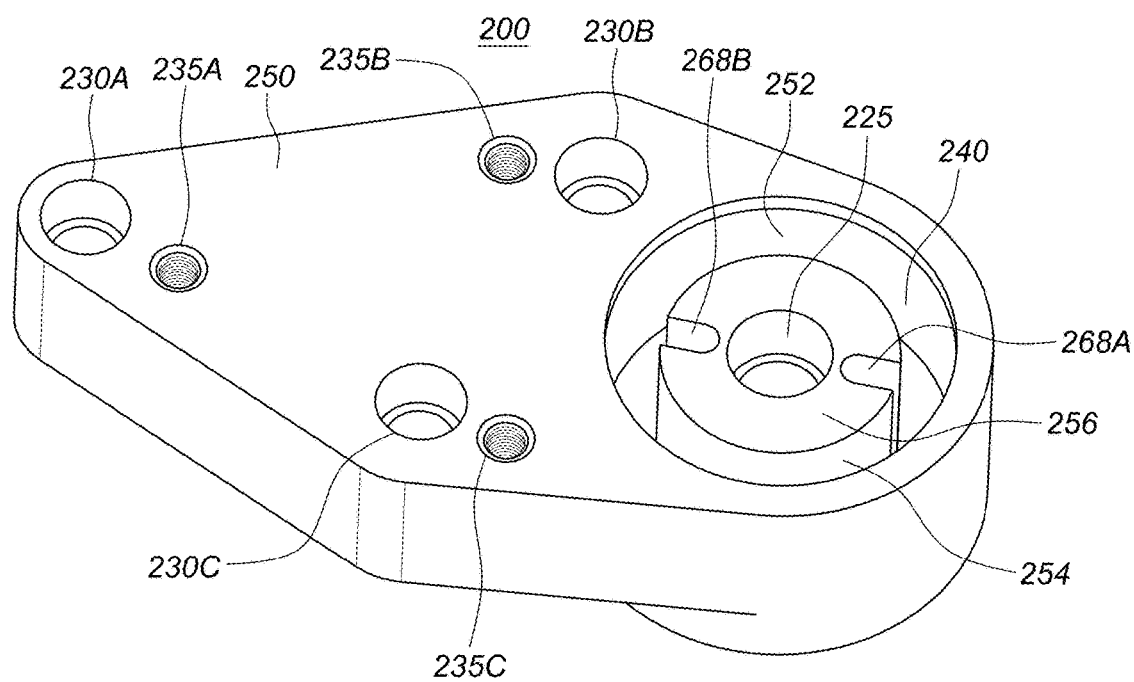
Figure 2E:
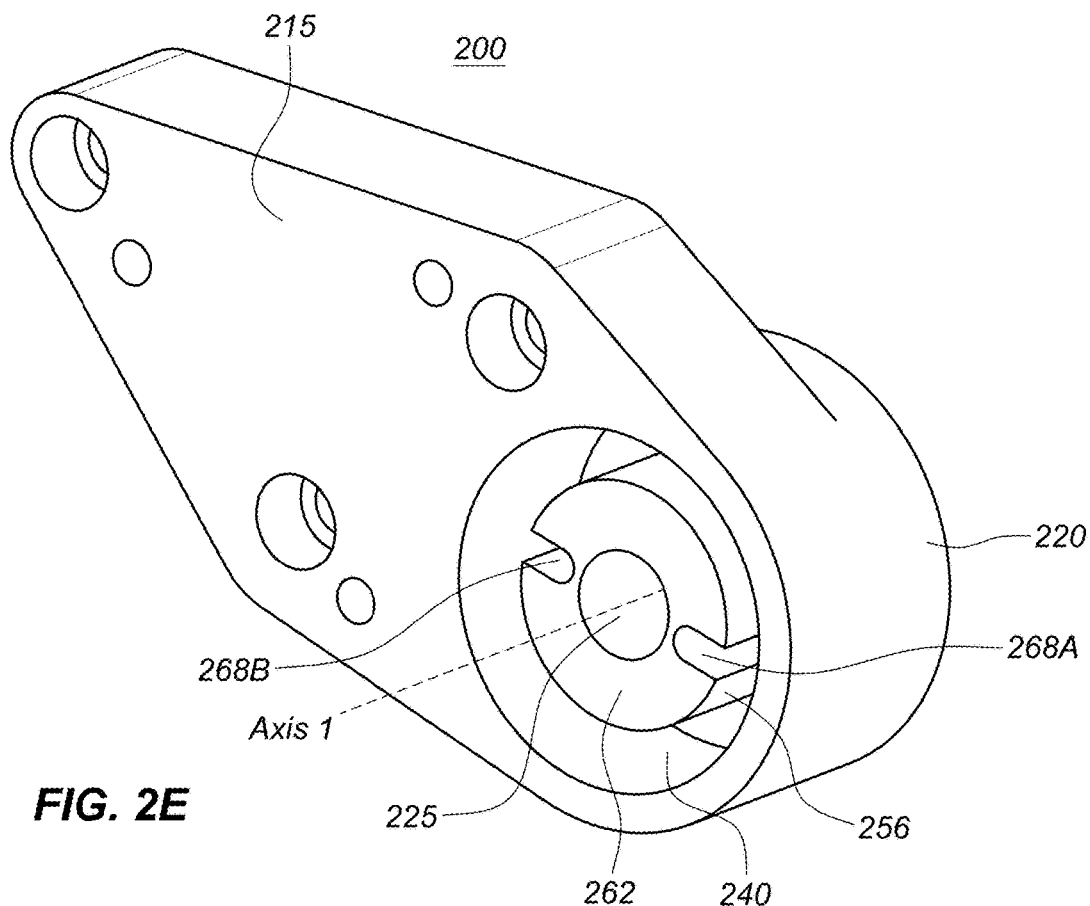
Figure 2F:
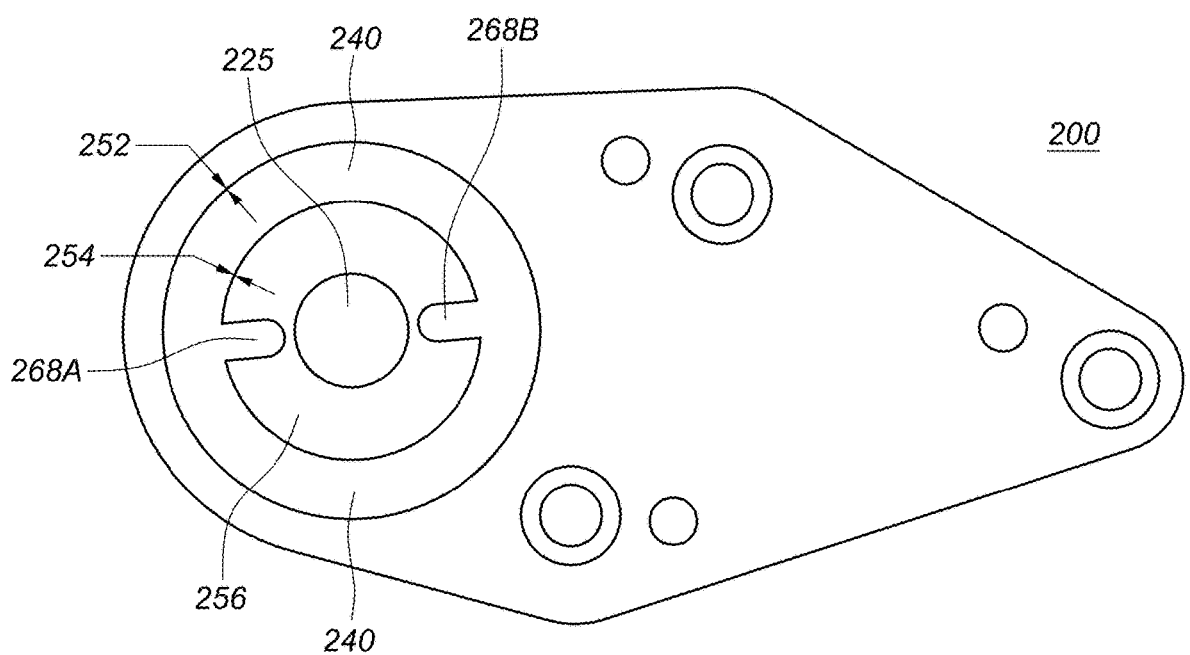
FIG. 2F is a top planar view illustrating selected features of the tensioner housing.
Figure 2G:
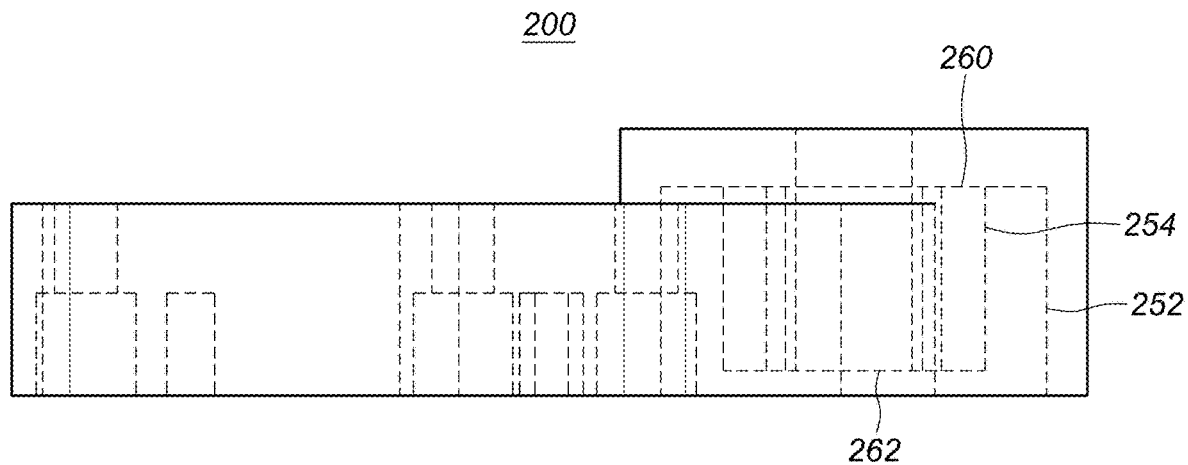
FIG. 2G is a side view illustrating selected features of the tensioner housing.
Figure 2H:
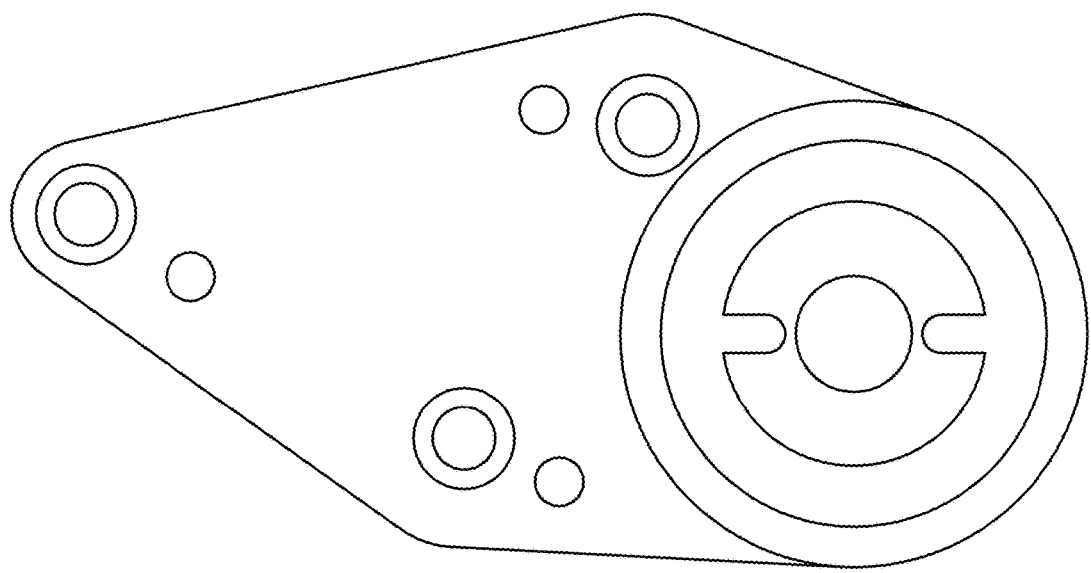
FIG. 2H is another top view illustrating selected features of the tensioner housing.
Figure 2I:
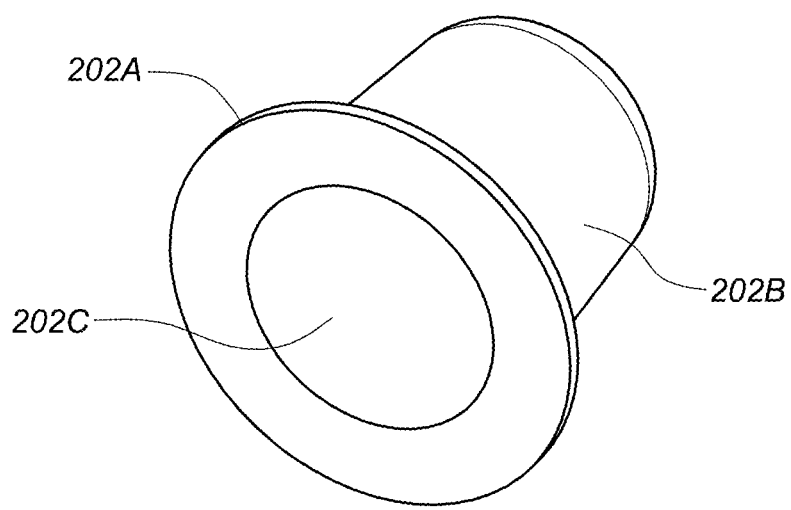
FIG. 2I is a perspective view illustrating selected features of the bushing of the tensioner housing.

FIGS. 1A through 1F are views illustrating selected features of a reconfigurable tensioner 100 in a first configuration. FIGS. 1G and 1H are views of the tensioner 100 in a second configuration. The tensioner 100 includes a housing 200 with a bushing 202; an arm 300 with an axle 302 and a washer 304; and a spring 400. FIGS. 2A and 2B are perspective views that illustrate selected features of the housing 200 with the bushing 202 placed as it would be after assembly of the tensioner 100; FIGS. 2C and 2D are perspective views of the housing 200 with the bushing 202 obscured; FIG. 2E is another perspective view illustrating selected features of the housing 200; FIG. 2F is a top planar view illustrating selected features of the housing 200; FIG. 2G and FIG. 2H are, respectively, side and top views illustrating selected features of the housing 200 and dimensions (inches) of an example; and FIG. 2I is a perspective view of the bushing 202. The housing 200 and the arm 300 may be made, for example, from steel, iron, another metal, or still another material with sufficient hardness.

A first side 210 of the housing 200 has a step 220 protruding from a base 215. An arm positioning hole 225 is formed in the base 215 and going through the step 220, concentric with the step 220 in this embodiment. The base 215 has three holes 230A/230B/230C that allow fastening the tensioner 100, for example, bolting the tensioner 100 to an engine block. The housing 200 also has three holes 235A/235B/235C that may be used, for example, to attach additional components/accessories, such as a bracket for an air conditioning compressor. As can be understood from FIG. 2G, the holes 230A/230B/230C have a smaller diameter nearer the first side 210 and a relatively larger diameter nearer a second side 250 of the housing 200, which is opposite and parallel to the first side 210.

A spring receptacle 240 is formed on the second side 250, concentric with the hole 225, between a round wall 252 and the outside wall 254 of a center member 256. In this embodiment, the spring receptacle 240 does not go completely through the housing 200, thus a floor 260 is formed parallel to the first side 210. The center member 256 is substantially cylindrical, with the arm positioning hole 225 going through it, and its top surface 262 somewhat lower than the second side 250. A first spring retaining indent 268A and a second spring retaining indent 268B are formed in the outside wall 254 of the center member 256.

The bushing 202 may be made from various materials, such as plastic/polymer, copper, brass, and others. The bushing 202 includes a cap 202A and a main bushing portion 202B, with a bushing opening 202C through the cap 202A and the main bushing portion 202B. The outside of the main bushing portion 20213 is sized for snug fit inside and be retained by the arm positioning hole 225. (Snug fit here means preventing manual removal of the bushing 202 from the arm positioning hole.) The cap 202A prevents the bushing 202 from moving too far along the center axis (Axis1) of the arm positioning hole 225. In operation, the bushing 202 is inserted into the arm positioning hole 225 from the first side 210, and pushed down, leaving the cap 202A protruding above the step 220. The snug fit of the bushing 202 in the positioning hole 225 may not allow rotation of the bushing 202 in the hole 225, in normal operation.

Figure 3A:
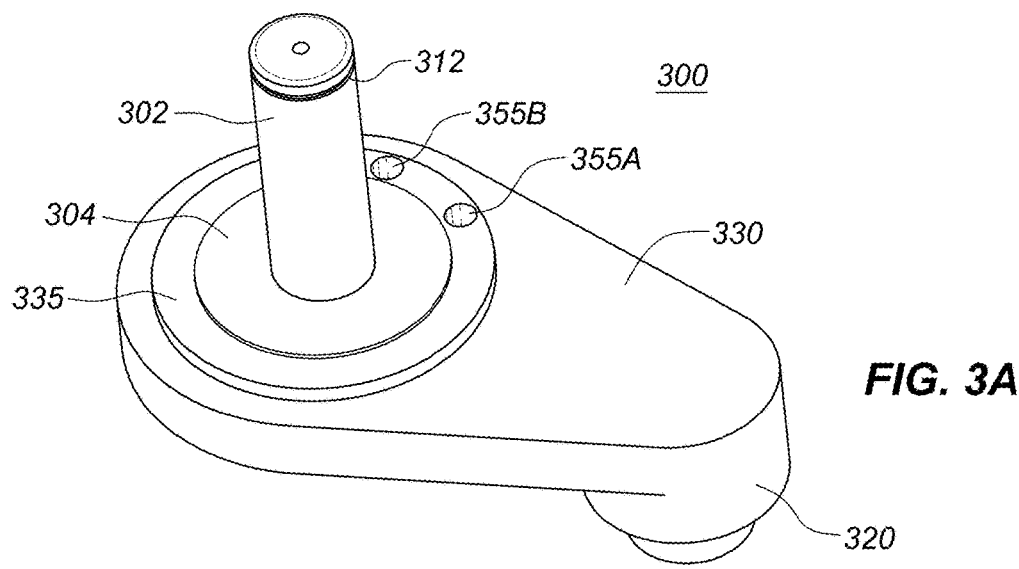
FIGS. 3A through 3C are perspective views illustrating selected features of an assembled tensioner arm.
Figure 3B:
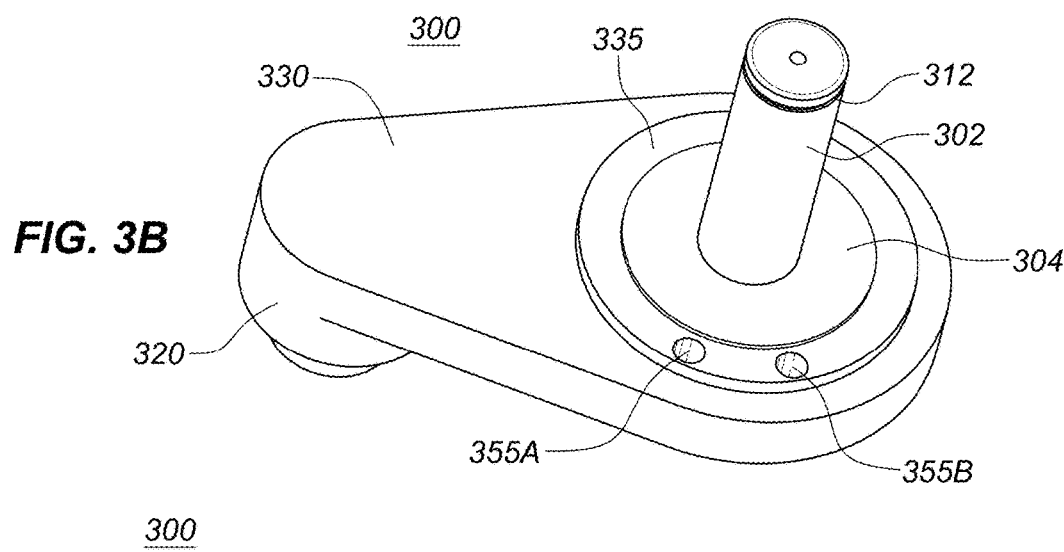
Figure 3C:
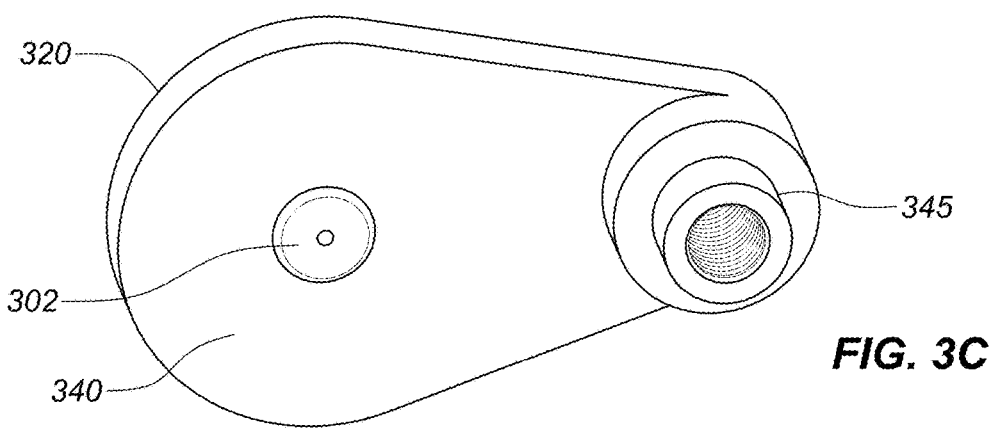
Figure 3D:
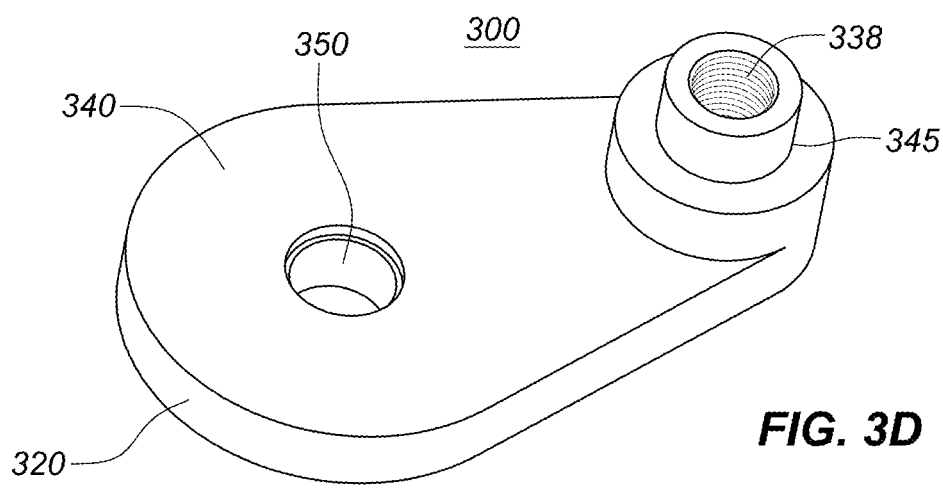
FIGS. 3D through 3I are perspective views illustrating selected features of the body of the tensioner arm.
Figure 3E:
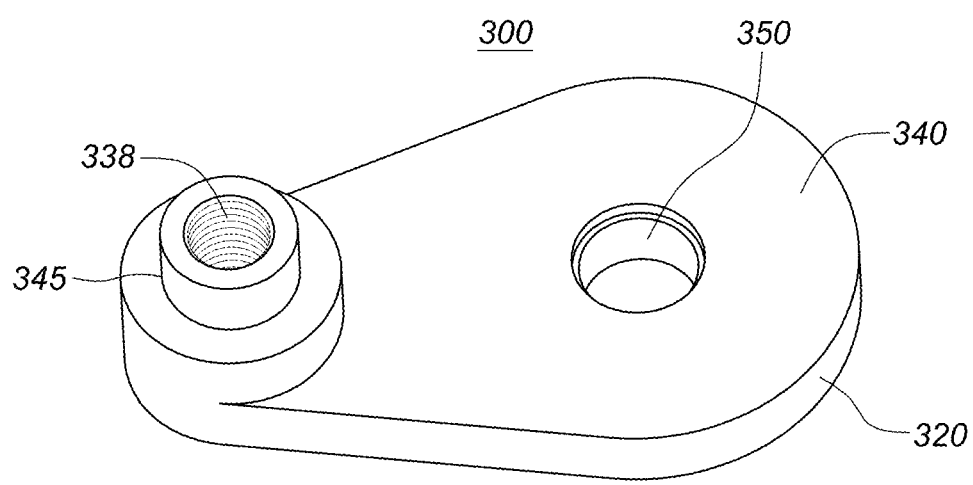
Figure 3F:
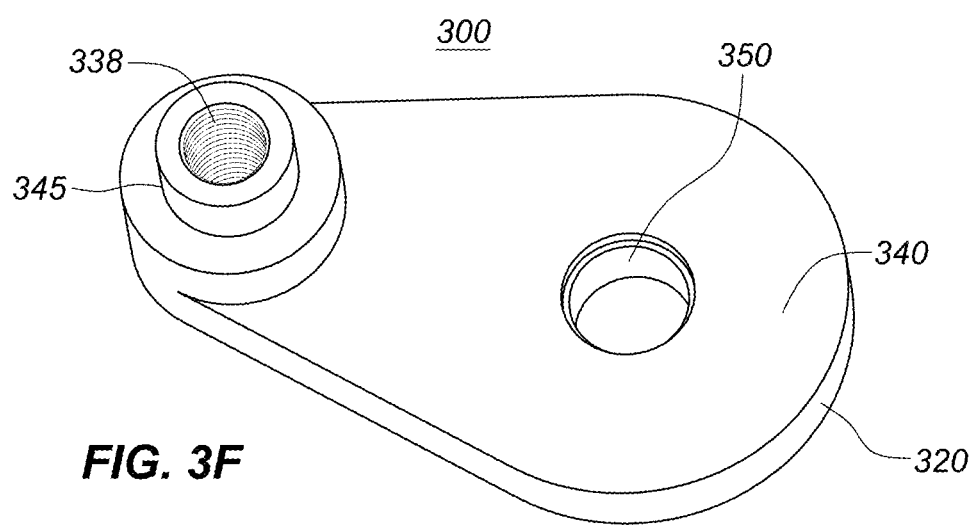
Figure 3G:
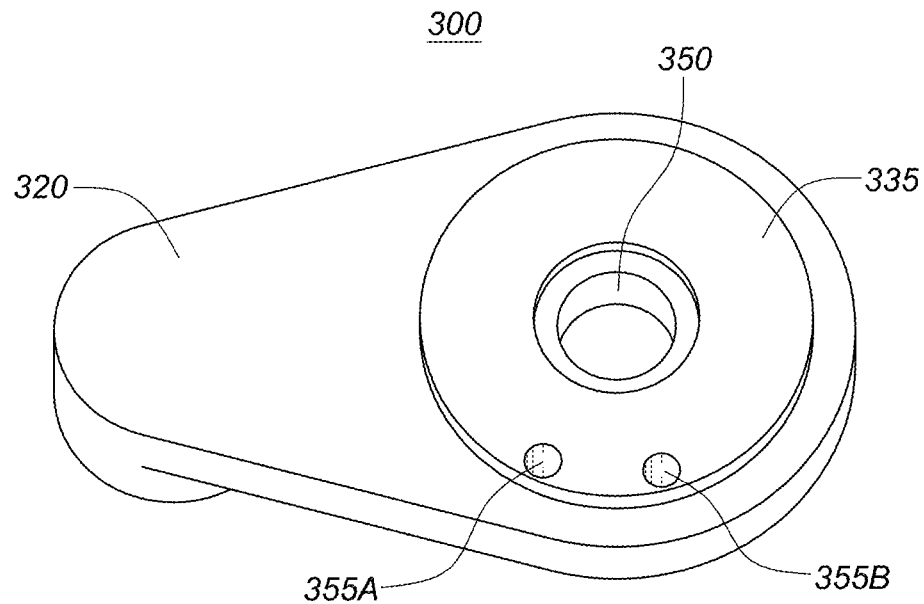
Figure 3H:
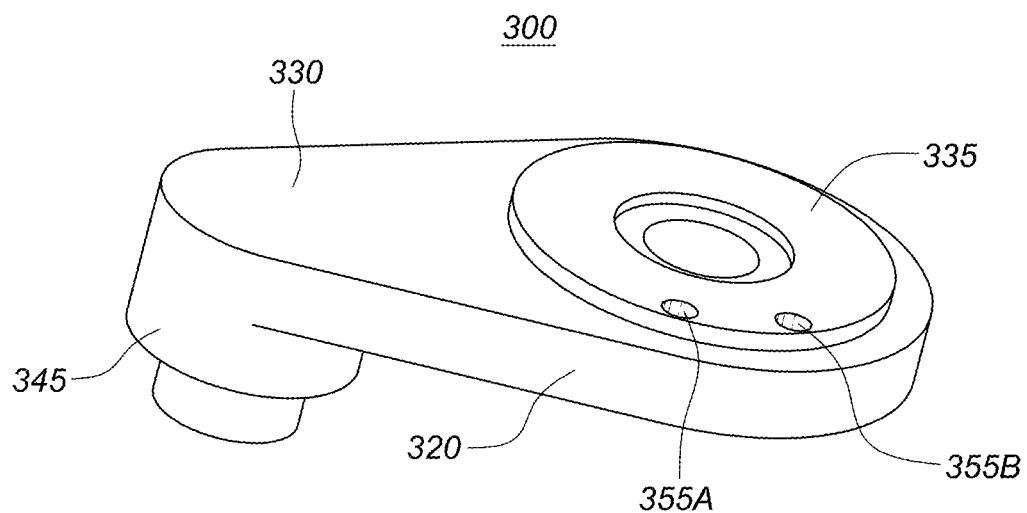
Figure 3I:
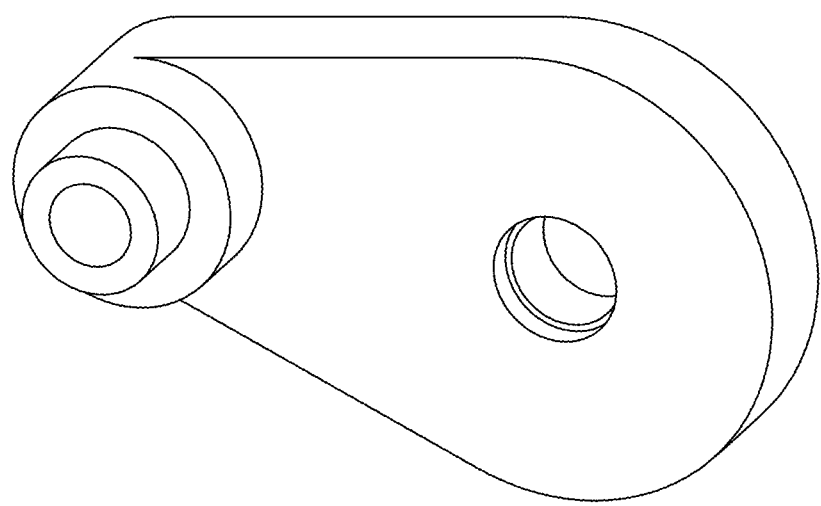
Figure 3J:
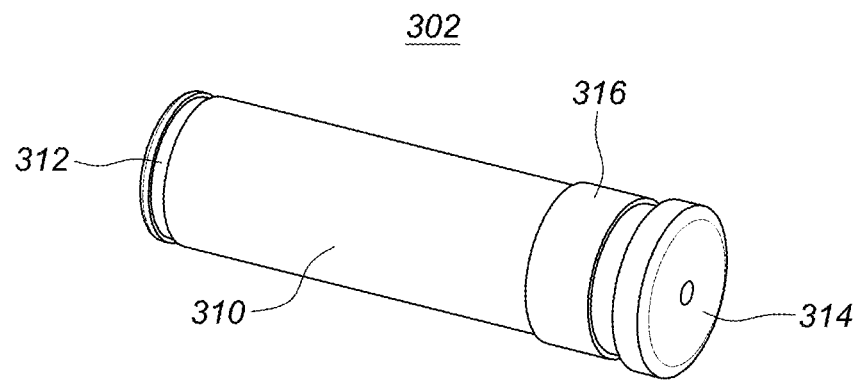
FIGS. 3J and 3K are perspective views and FIG. 3L is a planar view illustrating selected features of the tensioner arm axle.
Figure 3K:
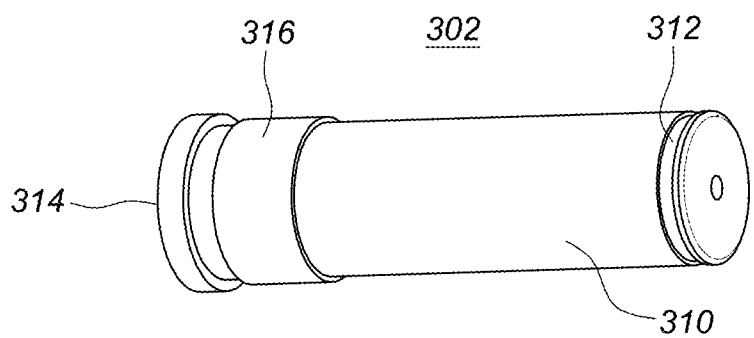
Figure 3L:
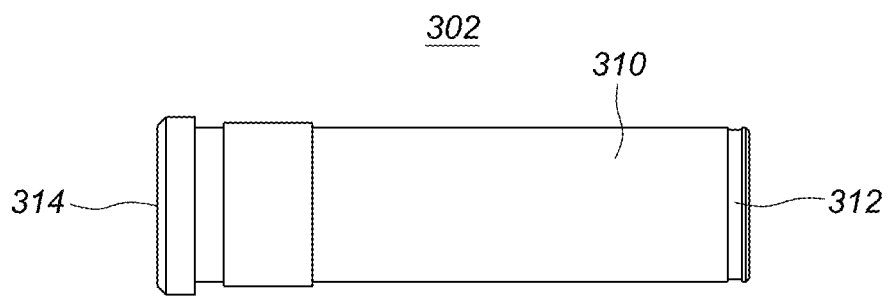
Figure 3M:
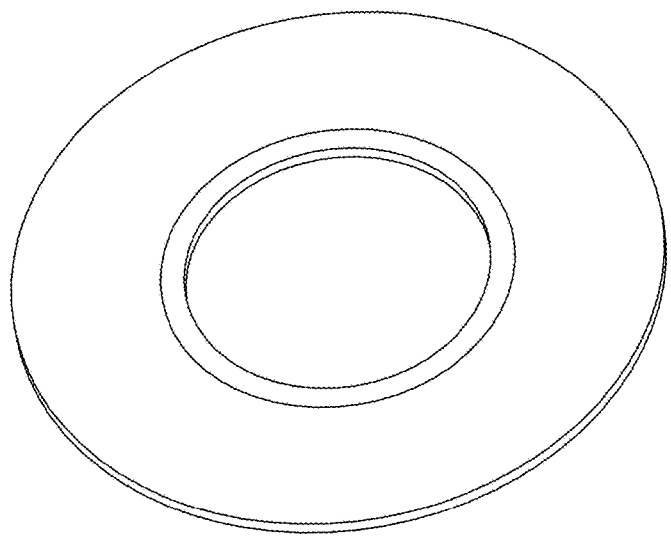
FIG. 3M is a perspective view illustrating selected features of the arm washer and snap ring.
Figure 3M:
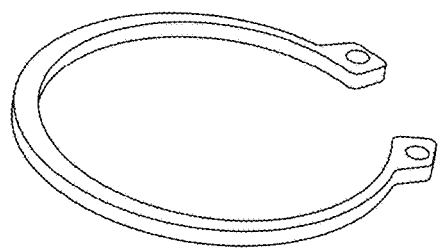

FIGS. 3A through 3C illustrate selected features of the arm 300 assembled with the axle 302 and the washer 304. FIGS. 3D through 3I are various views that illustrate selected features of the arm 300, without the axle 302 and without the washer 304. FIGS. 3J through 3L, illustrate selected features of the axle 302. FIG. 3M is a perspective view illustrating selected features of the washer 304 and a snap ring 318.

The axle 302 is cylindrical, having a main body 310 with portions forming a groove 312 on a first end of the main body 310, a cap 314 on a second end, and a thicker (for press-fitting) portion 316 near the cap 314. Here, the main body 310 has a narrower diameter relative to the diameter of the thicker portion 316.

The arm 300 has a main body 320 with a first side 330 and a second side 340. A pulley attaching portion 345 extends from the second side 340, and a round step 335 extends from the first side 330. In a typical installation, a threaded opening 338 in the pulley attaching portion 345 receives a bolt that attaches a rotating tensioner pulley used for tensioning the serpentine belt. (Other techniques of attaching the tensioner pulley can be used as well.) An axle receiving opening 350 is formed on the main arm body 320, going through the main body 320 including the step 335. The axle receiving opening 350 has a slightly larger diameter near the first side 330 than the slightly smaller diameter in the middle. In this embodiment, the slightly larger diameter at the second side 340 extends to a depth substantially equal the thickness of the cap 314 of the axle 302, while the smaller diameter will not allow the cap 314 to pass through the axle receiving opening 350. In this embodiment, when the axle 302 is installed in the opening 350 as shown in the Figures, the top of the cap 314 may be flush with the surface of the second side 340. The smaller diameter of the opening 350 is such that the axle 302 can be securely installed by press-fitting. In examples, the axle 302 installed by press-fitting into the opening 350 is attached securely enough for operation of the tensioner 100 on a passenger vehicle engine and cannot be removed manually because of the tight fit of the thicker portion 316 in the portion of the opening 350 with the smaller diameter.

The main body 310 of the axle 302 extends from the thicker portion 316 to the end of the axle 302 that is opposite the cap 314. The groove 312 is near the same end, with a relatively short length between the groove and the termination of the end of the axle 302. The grove 312 may be circular and may be designed to accommodate the snap ring 318. The center opening of the washer 304 is sized to fit around the main body 310 of the axle 302. As will be seen in more detail, the washer 304 may facilitate rotation of the arm 300 relative to the housing 200.

Figure 4A:
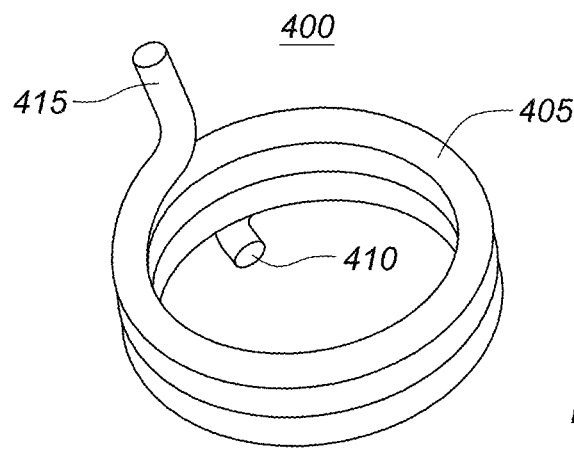
FIGS. 4A through 4C illustrate selected features of the tensioner spring.
Figure 4B:
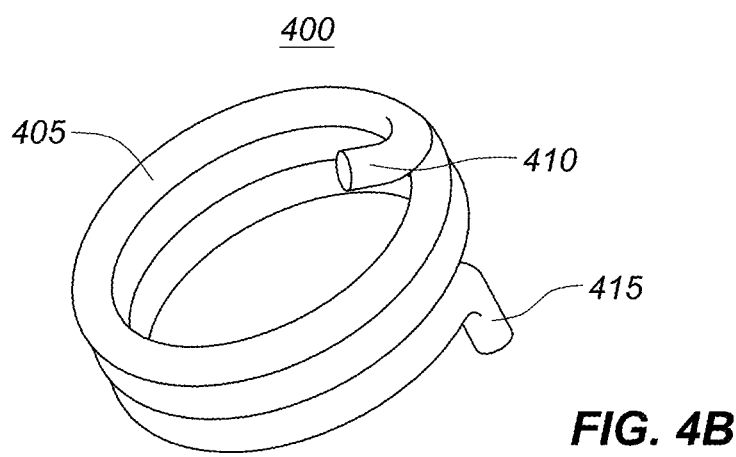
Figure 4C:
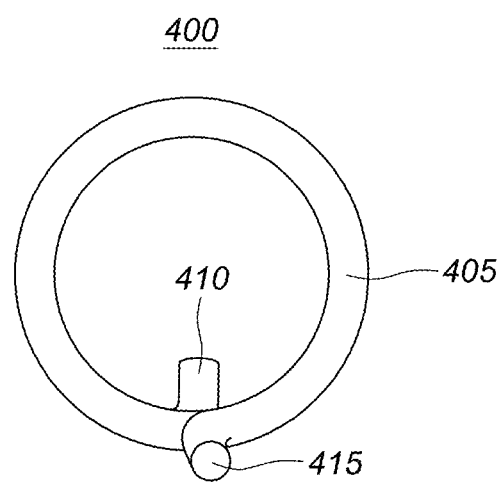

FIGS. 4A, 4B, and 4C illustrate selected features of the spring 400. In this example, the spring 400 is made from wire suitable for springs and for providing sufficient tension to the serpentine belt in the installations such as those discussed below in relation to FIG. 9. The wire forms a coiled body 405. A first end 410 of the wire is bent "horizontally," here meaning pointing towards the center of the coil/spring 400. A second end 415 of the wire is bent orthogonal to the first end; "vertically," here means parallel to the center axis of the coiled body 405, as shown. Although in this example the ends 410 and 415 begin (depart from the coiled body 405) approximately at the same radial of the coil, it is not a requirement; this will be discussed in more detail below, in relation to FIG. 8.

The spring 400 is inserted into the spring receptacle 240, with the first end 410 being inserted into one of the spring retaining indents 268A or 268B, depending on the desired configuration of the tensioner 100; the second end 415 points towards the second side 250 of the housing 200, and may protrude above the surface 262 of the center member 256, and possibly also above the surface of the second side 250 of the housing 200.

Figure 5A:
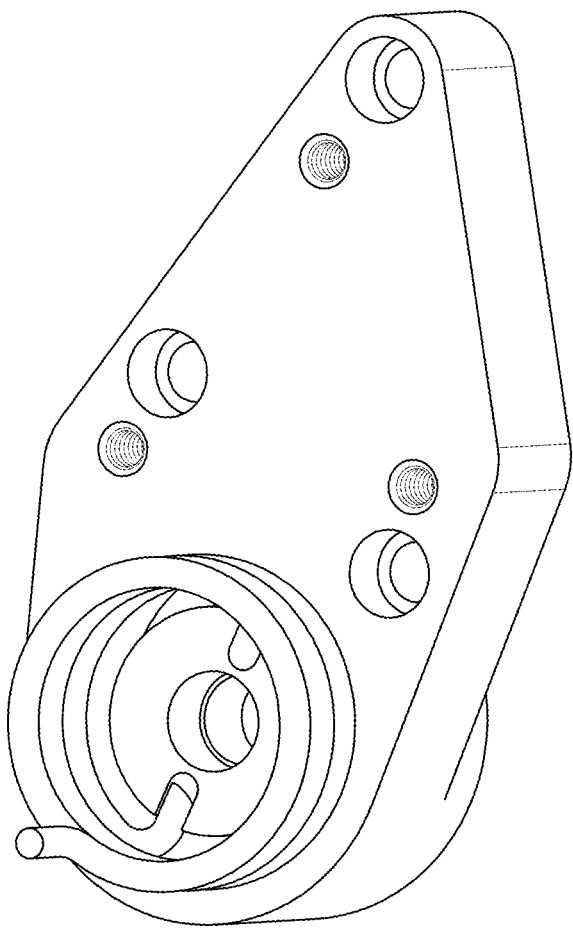
FIGS. 5A, 5B, 5C, 5D, 6, and 7 illustrate selected features of assembly of the tensioner housing, arm, and spring in two selected configurations.
Figure 5B:
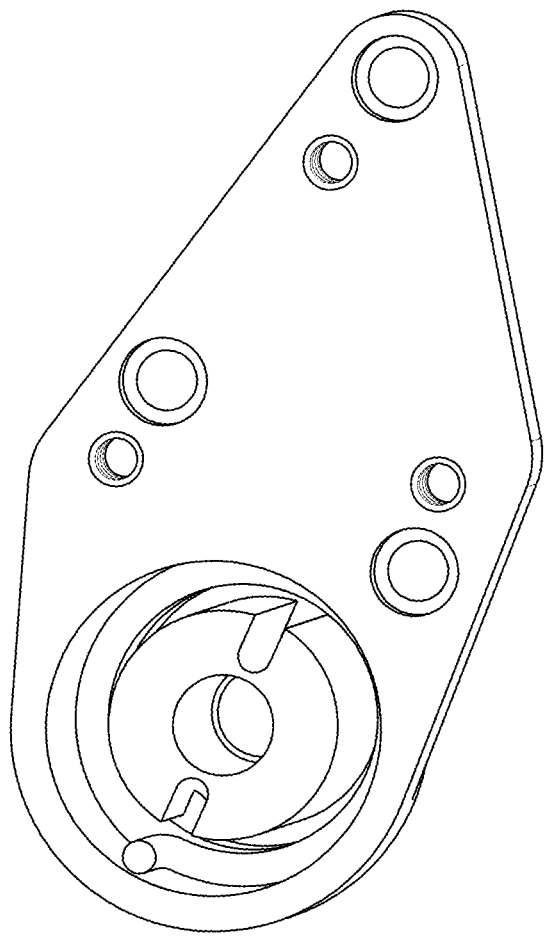
Figure 5C:
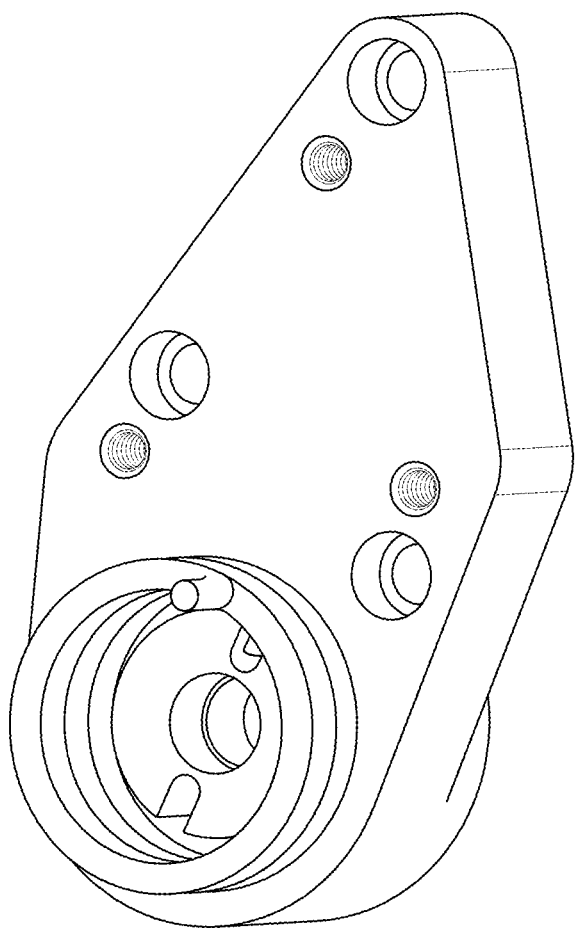
Figure 5D:
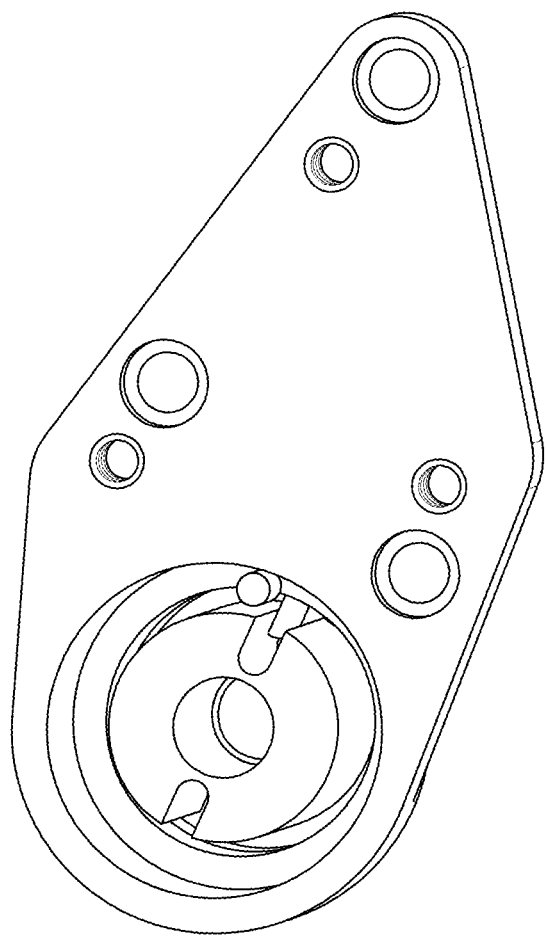

FIG. 5A and FIG. 5B illustrate the insertion of the spring 400 into a position corresponding to the first configuration, while FIG. 5C and FIG. 5D illustrate the insertion of the spring 400 into a position corresponding to the second configuration.

Turning now back to the arm 300, note a first pit 355A and a second pit 355B on the surface of the round step 335. Each of the pits 355A/355B is sized to receive the second end 415 at the spring 400. In operation, the particular pit 355A/355B that receives the second end 415 is selected depending on the desired configuration of the tensioner 100. As will be discussed in more detail below in relation to the illustrated embodiment, when the first end 410 is inserted into the first spring retaining indent 268A and the second end 415 is inserted into the first pit 355A, the tensioner 100 is in the first configuration; similarly, when the first end 410 is inserted into the second spring retaining indent 268B and the second end 415 is inserted into the second pit 355B, the tensioner is in the second configuration. The first tensioner configuration may correspond to an engine installation with an air conditioning compressor, and the second tensioner configuration may correspond to an installation without the air conditioning compressor.

Figure 6:
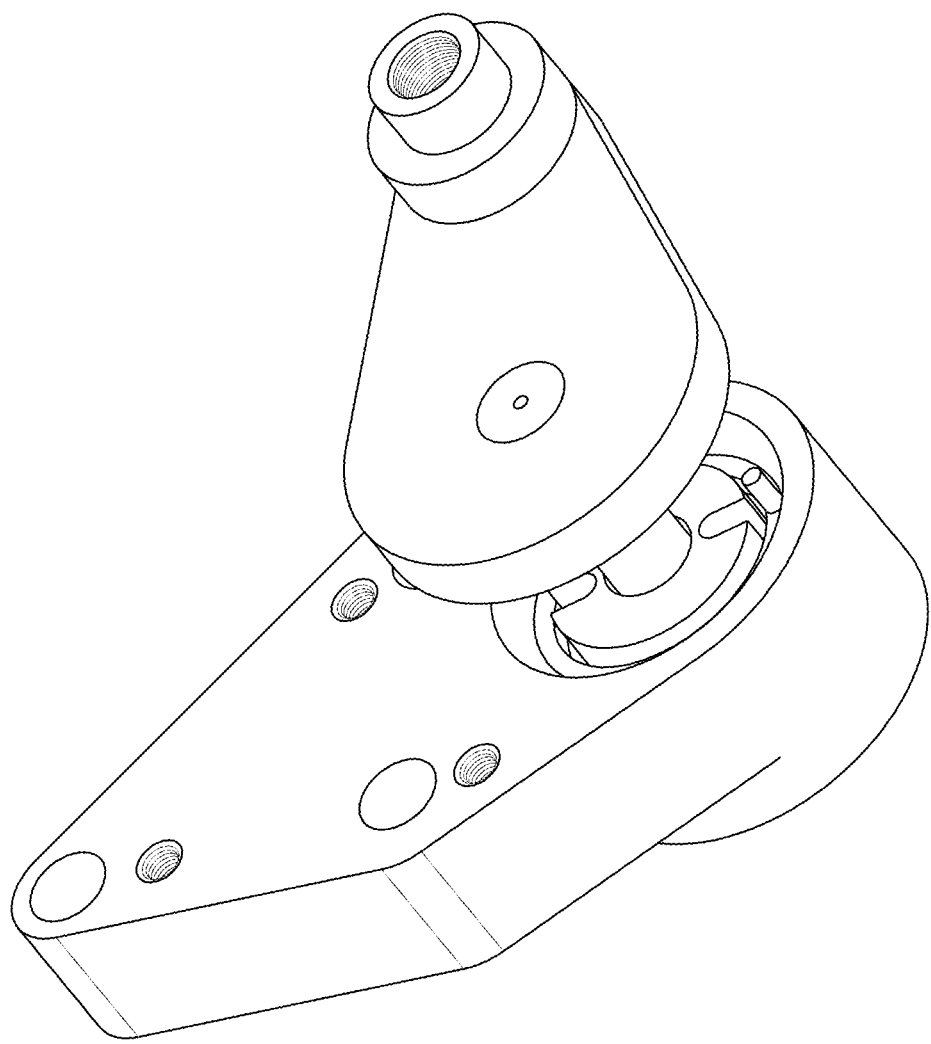

Once the spring 400 is seated in the spring receptacle 240, the arm 300 (assembled, with the axle 302 and the washer 304) may be attached to the housing 200 by inserting the axle 302 (the main body 310) into the arm positioning hole 225, from the second side 250. The insertion is performed so that the second end 415 of the spring 400 is seated in one of the pits 355A/35513, as selected. The pits 355A/355B may be sufficiently deep to receive the second end 415 to the degree necessary to seat the arm 300 with the step 335 being inserted into the spring receptacle 240 and the surface of the second side 250 of the housing 200 contacting the surface of the first side 330 outside the step 335. The washer 304 is located between the surface of the step 335 on the first of the arm 300 and the surface 262 of the housing 200, facilitating the rotation of the arm 300 relative to the housing 200. The groove 312 protrudes just beyond the cap 202A of the bushing 202, which is just above the surface of the first side 210 of the housing 200 (which here is the surface of the step 220). The snap ring 318 may then be placed into the groove 312, preventing the axle 302 and the arm 300 from sliding out of the hole 225 and the spring receptacle 240. The assembled tensioner 100 is thus obtained. FIG. 6 illustrates the attachment of the arm 300 to the housing 200 to form a first configuration of the tensioner 100. Here, the first end 410 of the spring 400 is inserted in the first retaining indent 268A, and the second end 415 is seated in the first pit 355A.

In the illustrated embodiment, the diameter of step 335 is slightly smaller than the diameter of the arm positioning hole 225 (or the portion of the hole 225 at the second side 250 of the housing 200); the step 335 fits snugly in the arm positioning hole 225, but allows the arm 300 to be manually inserted into and removed from the arm positioning hole 225, and allowing the arm 300 to be rotated manually relative to the housing 200. This fit provides support and centering to the arm 300 and the axle 302 when the arm 300 is attached to the housing 200, The support and centering are in addition to the support and centering provided to the axle 302 by the bushing 202 inserted into the arm positioning hole 225 from the first side 210 of the housing 200.

Figure 7A:
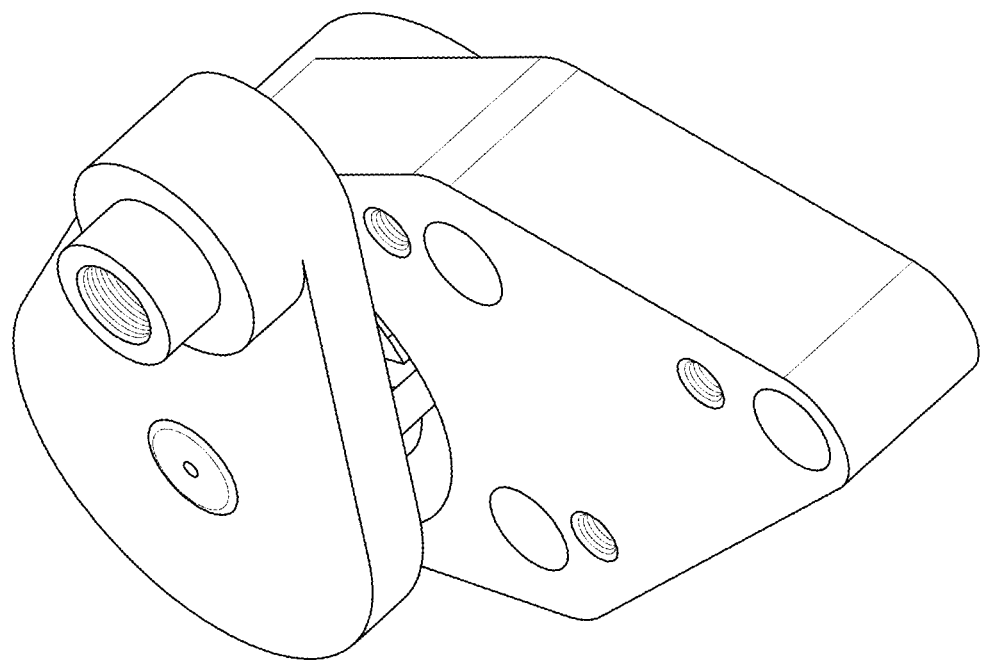
Figure 7B:
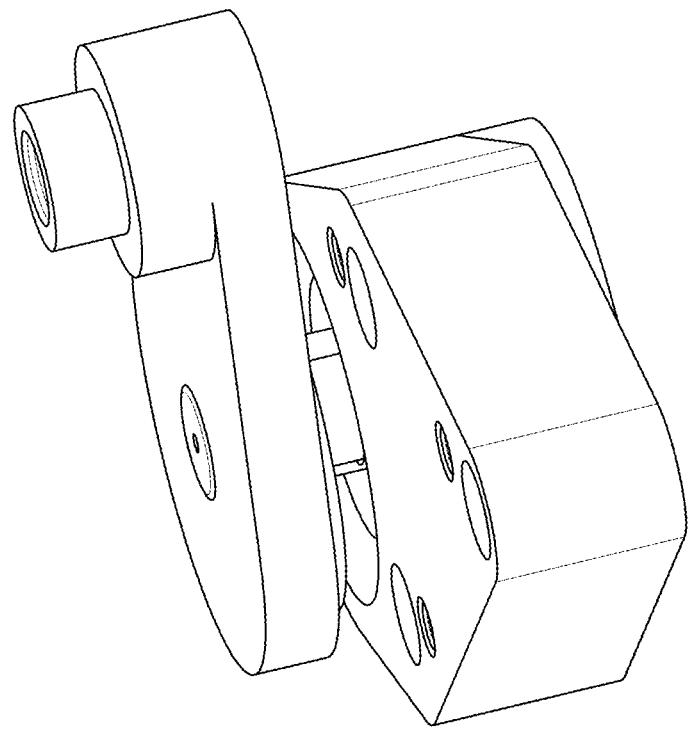

To form the second configuration, the spring 400 may be inserted into the spring receptacle 240 so that the first end 410 is inserted in the second indent 268B and the second end 415 is seated in the second pit 355B. FIG. 7A and FIG. 7B illustrate the attachment of the arm 300 to the housing 200 to form the second configuration.

In examples, the groove 312 on the axle 302 is replaced by a diametric axle hole through the sides of the main body 310 of the axle 302 (orthogonal to the main axis of the axle 302), and the snap ring is replaced by a cotter pin that is placed through the axle hole to fasten the axle 302 in the arm positioning hole 225. In examples, the groove 312 is replaced by a thread on the first end of the axle 302, and a nut with a matching thread is screwed onto the first end of the axle 302 to fasten the axle in the arm positioning hole 225, Other fastening method may be employed as well.

Figure 8:
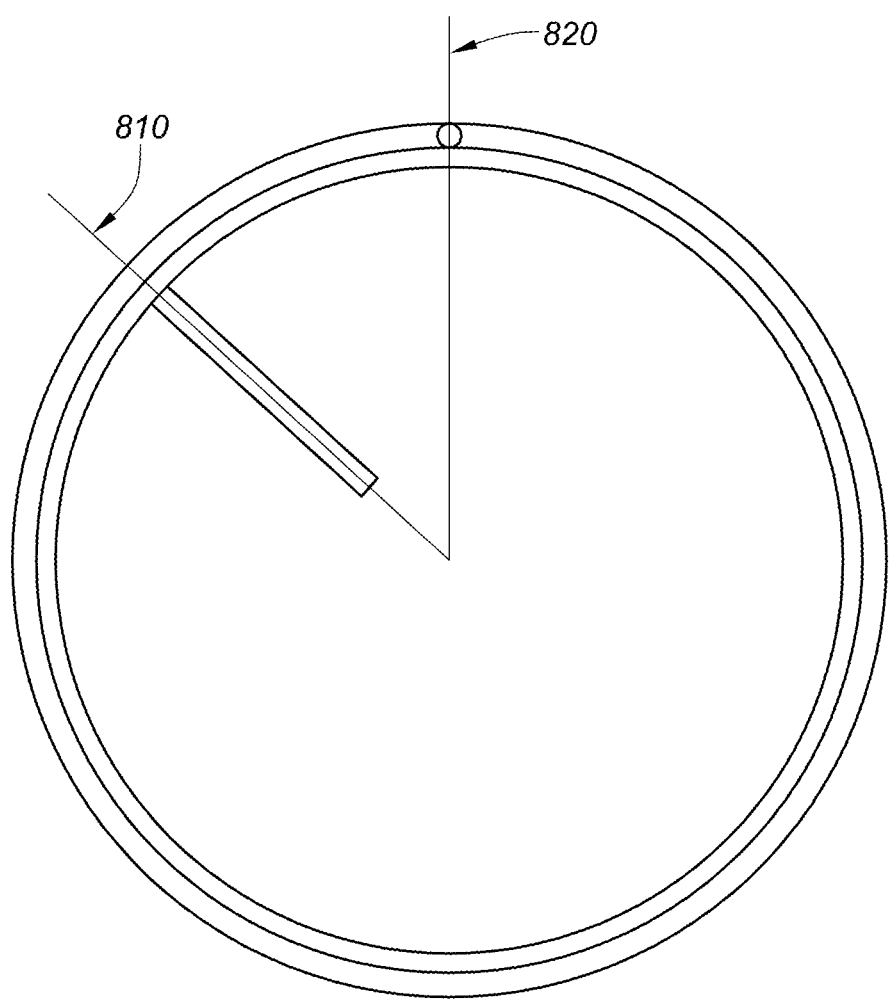
FIG. 8 is a schematic illustration of an alternative tensioner spring.

As a person skilled in the an would understand after careful perusal of this document with the attached drawings, the embodiment shown in the Figures can have more than two configurations. In general, for this type of design with I spring retaining indents such as the indents 268A/268B in the center member such as the center member 236) and J pits on the surface of the round step 335, the total number of configurations may be I×J. The illustrated embodiment, therefore, can have four configurations. The first configuration using the first spring retaining indent 268A and the first pit 355A, and the second configuration using the second spring retaining indent 268B and the second pit 35513 have already been discussed. A third configuration may use the first spring retaining indent 268A with the second pit 35513, and a fourth configuration may use the second spring retaining indent 268B with the first pit 355A. Another way to enable multiple configurations is to provide multiple (two or more) springs such as the spring 400, but with the two ends at different radials. FIG. 8 schematically illustrates top view of a spring 800 with the first end at a radial 810, and a second end at a different radial 820. More generally, the methods may be used in any combination or permutation:

| Indent(s) (I) | Pit(s) (J) | Spring(s) (K) |
|---|---|---|
| One | Multiple | Multiple |
| One | One | Multiple |
| One | Multiple | One |

-continued

| Indent(s) (I) | Pit(s) (J) | Spring(s) (K) |
|---|---|---|
| Multiple | Multiple | Multiple |
| Multiple | Multiple | One |
| Multiple | One | Multiple |
| Multiple | One | One |

Figure 9A:
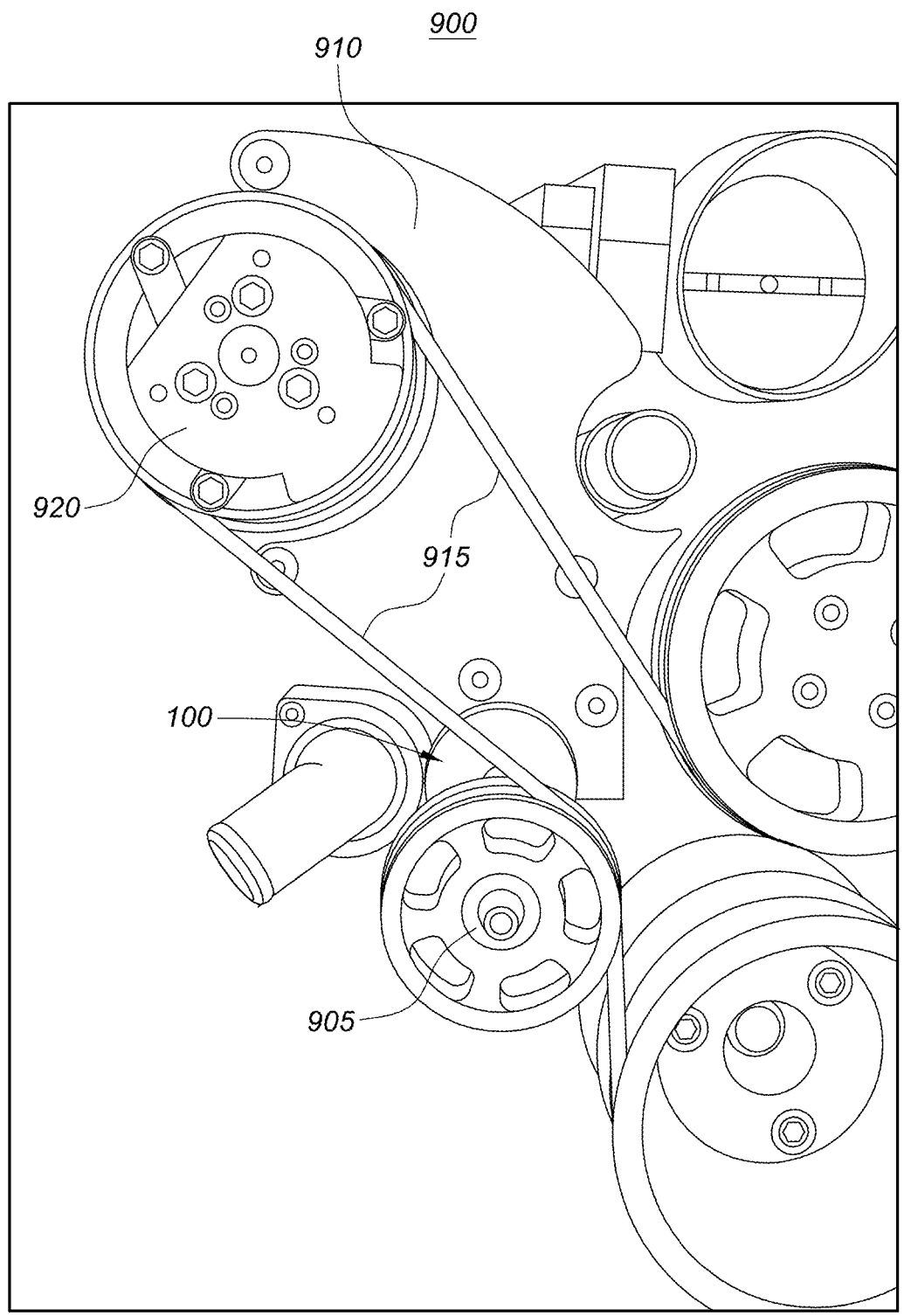
FIGS. 9A through 9C illustrate selected features of passenger vehicle installations of the tensioner, in different configurations.
Figure 9B:
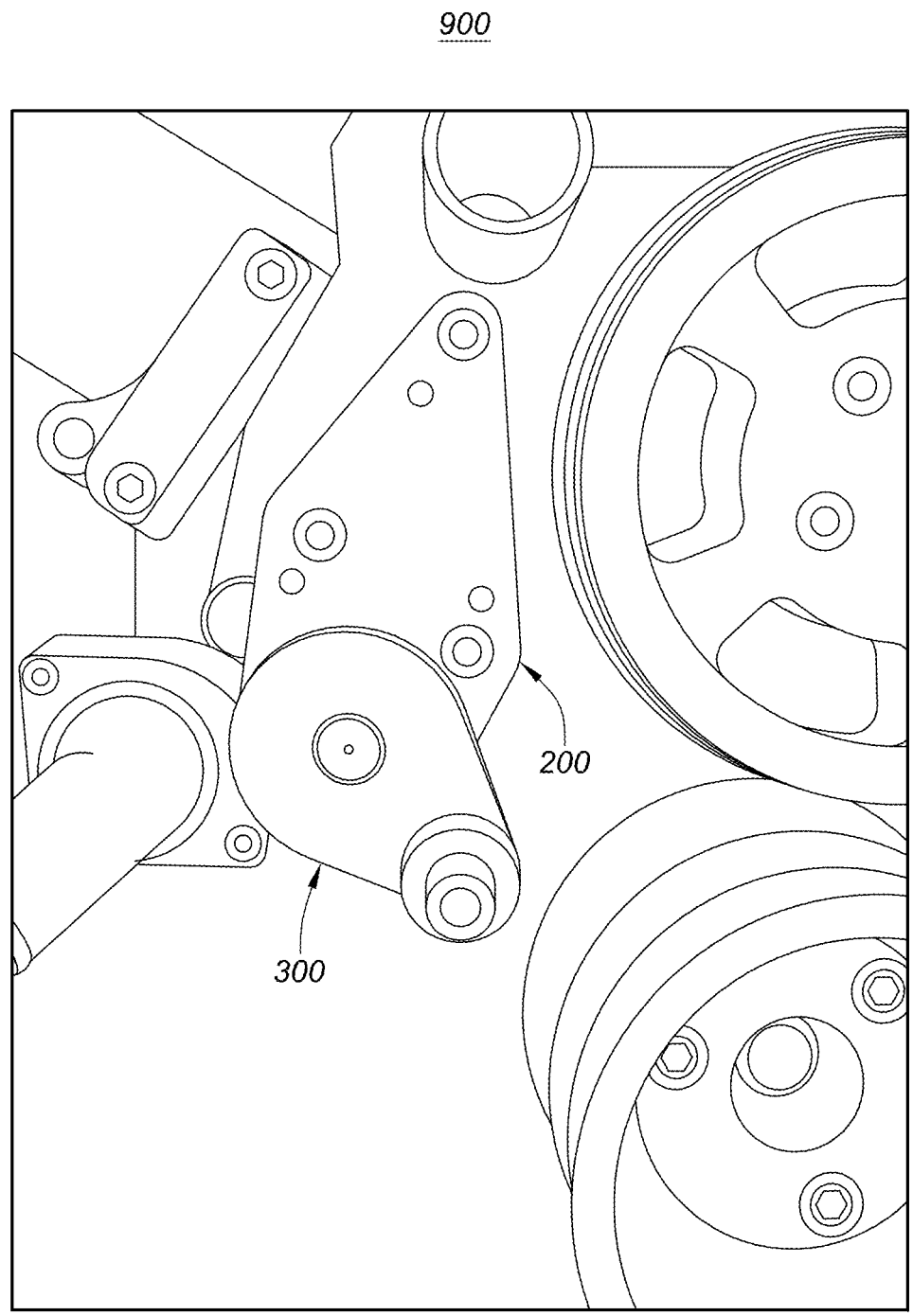

FIG. 9A illustrates selected features of an arrangement 900 that includes the tensioner 100 installed on an LS-based GM small-block engine. In this arrangement, a tensioner pulley 905 is installed on the pulley attaching portion 345, an AC compressor bracket 910 is attached to the tensioner 100 using the holes 235A/235B/235C, and a serpentine belt 915 drives an air conditioning compressor pulley 920. FIG. 9B is a close up view of the tensioner 100 in the arrangement 900. Here, the tensioner is in the first configuration; and the tensioner pulley 905, the AC bracket 910, the serpentine belt 915 and the air conditioning pulley 920 have been removed. The angle of the arm 300 relative to the housing 200 in FIG. 9A is larger than the in angle in FIG. 9B, in which the tensioner 100 is still in the first configuration. This is because the tensioner 100 applies pressure on the serpentine belt 915, and vice versa against the pressure of the spring 400. In this way, the angle is increased and the serpentine belt 915 is under tension.

Figure 9C:
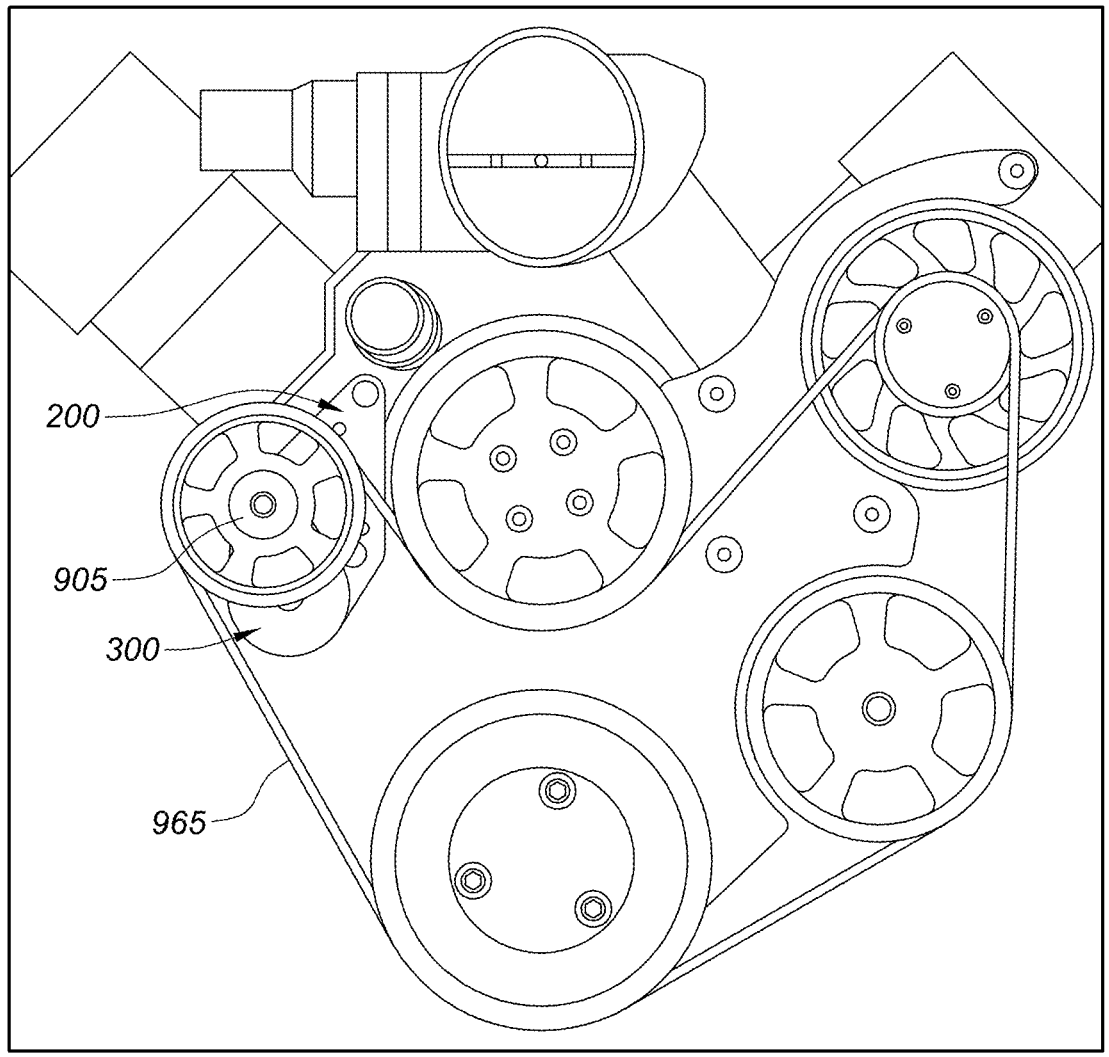

FIG. 9C illustrates selected features of an arrangement 950 that includes the tensioner 100 installed on an LS-based GM small-block engine. In this arrangement, the tensioner pulley 905 is also installed on the pulley attaching portion 345, but there is no AC compressor bracket. A belt 965 may be somewhat shorter than the belt 915 in FIG. 9A, because of the absence of the air conditioning components. The tensioner 100 is in the second configuration. The angle of the arm 300 relative to the housing 200 in FIG. 9C also differs from the same angle in the absence of the serpentine belt 965, because the tensioner 100 applies pressure on the serpentine belt 965, and vice versa.

The features (elements/limitations) described throughout this document may be present individually, or in any combination or permutation, except where the presence or absence of specific features is inherently required, explicitly indicated, or is otherwise made clear from the description. This applies whether or not the features appear related to specific embodiments; in other words, features of one described or illustrated embodiment may be included in another described or illustrated embodiment.

Although steps of various methods may have been described serially in this disclosure, some of these steps may be performed by separate elements in conjunction or in parallel, asynchronously or synchronously, in a pipelined manner, or otherwise. There is no particular requirement that the steps be performed in the same order in which this description/Figures list them, except where explicitly so indicated, otherwise made clear from the context, or inherently required. It should be noted, however, that in selected examples the steps are performed in the specific progressions described in this document and/or shown in the accompanying Figures. Furthermore, not every illustrated step may be required in every system, while some steps that have not been specifically illustrated may be desirable or necessary in some embodiments.

This document describes in some detail a reconfigurable belt tensioner. This was done for illustration purposes. Neither the specific embodiments of the invention as a whole, nor those of its features necessarily limit the general principles underlying the invention. The specific features described herein may be used in some embodiments, but not in others, without departure from the spirit and scope of the invention as set forth herein. Various physical arrangements of components and various step sequences also fall within the intended scope of the invention. Many additional modifications are intended in the foregoing disclosure, and it will be appreciated by those of ordinary skill in the art that in some instances some features of the invention will be employed in the absence of a corresponding use of other features. The illustrative examples therefore do not necessarily define the metes and hounds of the invention. The illustrative example also do not necessarily define the legal protection afforded the invention, which function will be carried out by the issued claims of a non-provisional application, and their equivalents.

What is claimed is:

1. A reconfigurable belt tensioner, comprising:
   a housing comprising a first side housing surface and a second side housing surface parallel to the first side housing surface, the housing further comprising portions defining an arm positioning hole of a first diameter, a receptacle of a second diameter with a substantially cylindrical center member having an outside surface with a third diameter and a plurality of indents, wherein:
   the first diameter is smaller than the second diameter and the third diameter, and the third diameter is smaller than the first diameter,
   the center member, the arm positioning, hole, and the receptacle are concentric with a common first axis, and
   the arm positioning hole protrudes from the first side housing surface through the center member;
   an arm comprising a main body having a first side arm surface and a second side arm surface parallel to the first side arm surface, a pulley attaching portion extending from the second side arm surface, a circular step portion on the first side arm surface, and portions defining an axle receiving opening from the first side arm surface to the second side arm surface, and an axle, wherein:
   the circular step portion and the axle receiving opening are concentric,
   the circular step portion comprises portions defining a plurality of pits on the first side arm surface at substantially same distance from center of the circular step portion,
   the axle comprises a cylindrical axle body having first and second ends and a thicker portion on the second end, the axle being inserted into the axle receiving opening and being attached to the axle main body at the thicker portion, the axle extending from the circular step portion; and
   a spring comprising a coiled body, a horizontal end, and a vertical end, wherein:
   the first spring end fits in each of the plurality of indents, thereby preventing rotation of the spring relative to the cylindrical center member of the housing, and
   the second end of the spring fits in each of the pits of the circular step portion, thereby causing the spring into compression or extension when the arm is rotated relative to the housing;
   wherein:
   the spring is inserted into the receptacle with the horizontal end being inserted into a selected indent of the plurality of indents;

the axle is inserted into the arm positioning hole to protrude through the first side housing surface and fastened relative to the arm positioning hole near the first side housing surface.

2. The reconfigurable belt tensioner of claim 1, further comprising a bushing comprising a bushing cap and a main bushing portion having an outside bushing diameter, a bushing hole through the bushing cap and the main bushing portion, the bushing hole having an inside bushing diameter, the outside bushing diameter being sized to fit snugly into the arm positioning hole when the bushing is inserted into the arm positioning hole from the first side housing surface, the bushing cap preventing the bushing from going through the arm positioning hole, the inside bushing diameter allowing the axle to rotate in the bushing.

3. The reconfigurable belt tensioner of claim 2, wherein the bushing is made of material softer than material from which the housing is made.

4. The reconfigurable belt tensioner of claim 3, wherein the housing and the arm are made from one or more metals.

5. The reconfigurable belt tensioner of claim 2, wherein:
   the axle further comprises an axle cap on the first end of the axle, the axle cap preventing the axle from going through the axle receiving opening.

6. The reconfigurable belt tensioner of claim 5, wherein the axle receiving opening has a larger diameter at the circular step portion to a cap depth, and a smaller diameter from the second side arm surface to the cap depth from the cap depth, the cap depth is substantially equal to thickness of the axle cap, and the larger diameter at the circular step is substantially equal to diameter of the axle cap, so that the axle cap is substantially flush with the circular step portion.

7. The reconfigurable belt tensioner of claim 2, wherein the first end of the axle body comprises portions defining a groove, the groove protruding through the bushing cap when the axle is inserted into the arm positioning hole to protrude through the first side housing surface, the reconfigurable belt tensioner further comprising a snap ring placed on the groove thereby fastening the axle to the arm positioning hole.

8. The reconfigurable belt tensioner of claim 2, wherein the first end of the axle body comprises portions defining a diametrical cotter pin hole, the cotter pin hole protruding through the bushing cap when the axle is inserted into the firm positioning hole to protrude through the first side housing surface, the reconfigurable belt tensioner further comprising a cotter pin placed on the cotter pin hole thereby fastening the axle to the arm positioning hole.

9. The reconfigurable belt tensioner of claim 2, wherein die plurality of pits consists of a first pit and a second pit, and the plurality of indents consists of a first indent and a second indent.

10. The reconfigurable belt tensioner of claim 2, wherein the horizontal end of the spring and the vertical end of the spring are on same radial of the coiled body of the spring.

11. The reconfigurable belt tensioner of claim 2, wherein the horizontal end of the spring and the vertical end of the spring are on different radials of the coiled body of the spring.

12. The reconfigurable belt tensioner of claim 2, wherein the reconfigurable belt tensioner is provided with a second spring comprising a second spring coiled body, a second spring horizontal end, and a second spring vertical end, the angle between radials of the second spring vertical end and the second spring horizontal end being different from the angle between the radials of the spring horizontal end and the spring vertical end, thereby allowing reconfiguring the reconfigurable belt tensioner using different springs.

13. The reconfigurable belt tensioner of claim 2, wherein the thicker portion of the axle is press-fitted into the axle receiving opening.

14. The reconfigurable belt tensioner of claim 2, wherein the pulley attaching portion comprises a threaded hole to install a tensioner pulley.

15. The reconfigurable belt tensioner of claim 2, wherein the housing further comprises a plurality of tensioner attaching holes.

16. The reconfigurable belt tensioner of claim 15, wherein the housing further comprises one or more accessory attaching holes.

17. A combination of the reconfigurable belt tensioner of claim 16 and a tensioner pulley installed on the pulley attaching portion.

18. The reconfigurable belt tensioner of claim 2, further comprising a washer on the axle, the washer separating the circular step portion from the center member.

19. A belt tensioner, comprising:
a housing;
an arm with an axle and a pulley attaching portion; and
a spring;
wherein the housing, the arm, and the spring comprise means for reconfiguring the belt tensioner into multiple configurations.

\* \* \* \* \*

UNITED STATES PATENT AND TRADEMARK OFFICE
CERTIFICATE OF CORRECTION

| | |
|---|---|
| PATENT NO. | : 11,359,702 B2 |
| APPLICATION NO. | : 16/752169 |
| DATED | : June 14, 2022 |
| INVENTOR(S) | : Shihwen Chan |

It is certified that error appears in the above-identified patent and that said Letters Patent is hereby corrected as shown below:

In the Claims

Column 9, Line 31, in Claim 1, cancel "the arm positioning, hole, and the" and replace the cancelled text with --the arm positioning hole, and the--;

Column 10, Line 45, in Claim 8, cancel "firm positioning" and replace the cancelled text with --arm positioning--;

Column 10, Line 50, in Claim 9, cancel "die plurality" and replace the cancelled text with --the plurality--.

Signed and Sealed this
Twenty-sixth Day of July, 2022

Katherine Kelly Vidal
*Director of the United States Patent and Trademark Office*